(12) United States Patent
Prakash et al.

(10) Patent No.: US 10,970,457 B2
(45) Date of Patent: Apr. 6, 2021

(54) COLLABORATION MECHANISM

(71) Applicant: Citta LLC, New York, NY (US)

(72) Inventors: Sai Prakash, Brooklyn, NY (US);
Edwin Gnichtel, Madison, NJ (US)

(73) Assignee: Citta LLC, Malba, NY (US)

( * ) Notice: Subject to any disclaimer, the term of this patent is extended or adjusted under 35 U.S.C. 154(b) by 353 days.

(21) Appl. No.: 16/197,727

(22) Filed: Nov. 21, 2018

(65) Prior Publication Data

US 2019/0155870 A1    May 23, 2019

Related U.S. Application Data

(60) Provisional application No. 62/590,006, filed on Nov. 22, 2017.

(51) Int. Cl.
*G06F 40/197* (2020.01)
*G06F 40/103* (2020.01)
*G06F 40/14* (2020.01)

(52) U.S. Cl.
CPC .......... *G06F 40/103* (2020.01); *G06F 40/14* (2020.01); *G06F 40/197* (2020.01)

(58) Field of Classification Search
CPC ....... G06F 40/103; G06F 40/14; G06F 40/197
See application file for complete search history.

(56) References Cited

U.S. PATENT DOCUMENTS

| | | | |
|---|---|---|---|
| 6,061,697 A | 5/2000 | Nakao | |
| 6,341,291 B1 | 1/2002 | Bentley et al. | |
| 6,341,823 B1 | 1/2002 | Sollami | |
| 6,684,370 B1 | 1/2004 | Sikorsky et al. | |
| 6,897,880 B2 | 5/2005 | Samra | |
| 7,035,910 B1 * | 4/2006 | Dutta | G06Q 10/10 |
| | | | 707/999.008 |
| 7,231,450 B1 | 6/2007 | Clifford et al. | |
| 7,249,314 B2 * | 7/2007 | Walker | G06F 21/6227 |
| | | | 715/205 |
| 7,640,505 B1 | 12/2009 | Edmunds | |
| 8,566,711 B1 | 10/2013 | Srivastava | |
| 9,146,914 B1 | 9/2015 | Dhaundiyal | |
| 9,292,482 B1 * | 3/2016 | Thiesen | G06F 40/134 |
| 2002/0032707 A1 | 3/2002 | Takeoka | |
| 2002/0133516 A1 | 9/2002 | Davis et al. | |
| 2002/0156813 A1 | 10/2002 | Gardner | |
| 2004/0205653 A1 | 10/2004 | Hadfield et al. | |
| 2005/0028080 A1 | 2/2005 | Challenger et al. | |

(Continued)

OTHER PUBLICATIONS

Chaudhuri, "Hierachical Vs. Relational XML Schema Designs," LMI Consulting, (Jun. 2006) 24 pages.

(Continued)

*Primary Examiner* — Scott T Baderman
*Assistant Examiner* — Mario M Velez-Lopez
(74) *Attorney, Agent, or Firm* — Alston & Bird LLP; Neal J. McLaughlin

(57) ABSTRACT

Branch objects are created from master objects, which allow collaborators to edit drafts of those branch objects. Collaborators' draft branch objects are submitted to the master object owner and changesets are generated to identify any changes proposed by collaborators with respect to the current content of the master object. Proposed changes from collaborators are presented to the master object's owner or their delegate for approval.

15 Claims, 8 Drawing Sheets

(56) References Cited

U.S. PATENT DOCUMENTS

| | | |
|---|---|---|
| 2005/0120298 A1 | 6/2005 | Petrujkic |
| 2005/0198565 A1 | 9/2005 | McChrystal |
| 2006/0271603 A1* | 11/2006 | Mathias .............. H04L 67/1095 |
| 2007/0050713 A1 | 3/2007 | Yoshioka et al. |
| 2007/0101256 A1 | 5/2007 | Simonyi |
| 2007/0101261 A1 | 5/2007 | Kelly et al. |
| 2007/0180363 A1 | 8/2007 | Dance |
| 2007/0244935 A1 | 10/2007 | Cherkasov |
| 2008/0235569 A1 | 9/2008 | Arun et al. |
| 2009/0138792 A1 | 5/2009 | Cudich et al. |
| 2010/0077290 A1 | 3/2010 | Peuyo |
| 2010/0257457 A1 | 10/2010 | De Goes |
| 2011/0029634 A1 | 2/2011 | Gimson et al. |
| 2011/0040754 A1 | 2/2011 | Peto et al. |
| 2011/0246869 A1 | 10/2011 | Vion-Dury |
| 2012/0005156 A1 | 1/2012 | Grant et al. |
| 2012/0079400 A1 | 3/2012 | Nauerz et al. |
| 2012/0110445 A1 | 5/2012 | Greenspan et al. |
| 2012/0117457 A1 | 5/2012 | Yuniardi |
| 2013/0019189 A1 | 1/2013 | Stewart et al. |
| 2013/0036348 A1 | 2/2013 | Hazard |
| 2013/0054701 A1 | 2/2013 | Leeder et al. |
| 2013/0326323 A1 | 12/2013 | Siwoff et al. |
| 2013/0326330 A1 | 12/2013 | Harris et al. |
| 2014/0068400 A1 | 3/2014 | Gulezian et al. |
| 2014/0281850 A1 | 9/2014 | Prakash et al. |
| 2014/0282078 A1 | 9/2014 | Taylor et al. |
| 2014/0331126 A1* | 11/2014 | Hunter .................. G06F 40/166 715/256 |
| 2014/0372369 A1* | 12/2014 | Babanov ............. G06F 16/1767 707/608 |
| 2015/0052427 A1* | 2/2015 | Vagell ................... G06F 40/166 715/256 |
| 2015/0193492 A1 | 7/2015 | Gunaratne et al. |
| 2016/0110313 A1 | 4/2016 | Prakash et al. |
| 2016/0321228 A1* | 11/2016 | Thiesen ................ G06F 40/134 |
| 2017/0220546 A1* | 8/2017 | Codrington ............ G06Q 10/10 707/999.008 |

OTHER PUBLICATIONS

Dec. 1, 2015 Non-Final Office Action in related U.S. Appl. No. 14/212,823.

Feb. 8, 2017 Non-Final Office Action in related U.S. Appl. No. 14/212,823.

International Preliminary Report on Patentability, dated Sep. 15, 2015 in International Application No. PCT/ US2014/28043.

International Search Report, dated Aug. 20, 2014 in International Application No. PCT/US2014/28043.

Jan. 12, 2018 Non-Final Office Action in related U.S. Appl. No. 14/212,823.

Jun. 16, 2017 Final Office Action in related U.S. Appl. No. 14/212,823.
Jun. 17, 2016 Final Office Action in related U.S. Appl. No. 14/212,823.
Sep. 25, 2018 Final Office Action in related U.S. Appl. No. 14/212,823.

Sep. 7, 2018 Non-Final Office Action in related U.S. Appl. No. 14/885,361.

Oct. 19, 2016 Advisory Action in related U.S. Appl. No. 14/212,823.

* cited by examiner

COLLABORATION MECHANISM

CROSS-REFERENCE TO RELATED APPLICATIONS

This application claims the benefit of U.S. Provisional Application No. 62/590,006, filed Nov. 22, 2017, which is hereby incorporated by reference in its entirety as if fully set forth herein. This application is also related to U.S. patent application Ser. No. 14/212,823, filed Mar. 14, 2014, and Ser. No. 14/885,361, filed Oct. 16, 2015, each of which are incorporated by reference in their entireties as if fully set forth herein.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

This specification relates to the creation of content presentable in multiple media forms, thereby improving personal productivity and content management. This specification also provides a collaborative document content editing system.

Content creation such as authoring documents, presentations, e-mails, etc., involves the creation of related content, often similar or the same content, across many different applications, for example, word processing, e-mails, spreadsheets, presentation slides, and other user applications or file types. Users often must create individual files in each application type containing the same or similar information and content. For example, a summary of a report must be extracted from a word processing document and pasted into presentation slides. As drafts of presentation slides are exchanged between users, commentary and additional related content are typically created in e-mails and editorial notes. Such a process involves the creation of multiple content files across multiple software applications having the same content or related versions of the content. Yet it is difficult and cumbersome to organize and track the many different files and versions of content can be lost in the process. Organizational and personal productivity software packages attempt to manage the creation of content across multiple media applications but the process is inefficient and negatively impacts productivity.

A significant factor hampering productivity continues to be the multitude of files in computing. Managing files, folders, versions, copies and synchronization gets in the way of productive content creation. The boundary between content types or file types (such as document, spreadsheet, database & presentation) currently enforced by most content creation suites is artificial and unnecessary. This boundary originated during the times when personal computers could only run one application at a time and when there were no real worldwide standards for creating content. These boundaries are perpetuated today to preserve revenue streams for big corporations and are unchallenged due to monopolies in the current market.

There is a need for users to create different types of content but not for separate applications to do so. Or put differently, there is a need to create content viewable and useable across multiple formats without being bound by file type. As such, there is a need for content creation that is a function of the individual (or team) aligned with their goals, which would define the context of the content.

In current content creation paradigms, the context of the content does not determine the way content is finally outputted, for example, if the context is about a presentation for work, the content will need to flow like a formal business presentation with a slide format. However, there is a need to refine the process of going from content creation to content format and output without burdening the user with figuring out how to deal with files, folders, copies, attachments in emails, different version of software tools and the like.

Further complicating current methods of creating and managing content across multiple applications is the issue of computer identity. Identity in personal computing is often meaningless—log-on credentials in a home environment are unimportant or meaningless to many users, largely because that credential does not bring much to the table and does not integrate, in a meaningful way, with other identities that are inevitable for the average user—most notably, social network identities, email accounts & corporate VPN credentials. There is a need to create and manage content such that content is continuously associated with identity yet differentiated by context and other attributes assigned to the context.

The market leading productivity suites of today are complex pieces of software. However, the licensing and distribution of these suites is obsolete and does not favor the average retail consumer today. Most suites are monolithic software packages with many individually-licensed applications that are expensive to deploy and maintain. Users are usually tied to a specific operating system, and consequently, some constrained hardware choices and form-factors. Despite common underpinnings (often with an XML slant to the schema), the applications in these suites still produce unique formats that preserve the need for complex integration patterns (embedded editors for cross-linking content). The Web is also viewed by these suites as lateral to the paradigm as opposed to being the center of a fundamental shift in the way people create, publish, collaborate on, store, find and sell intellectual property, which is the key variable of the productivity equation.

As such, the present use of proprietary document formats in productivity tools, typically email, documents (such as word processing documents), presentations (for example PowerPoint files), basic databases and basic spreadsheets limits productivity and collaboration. The file-dependence and architecture of present applications that produce content is obsolete as most computing paradigms are focused around the creation of files/folders and synchronizing them across devices etc. This results in discrete, individually licensed applications with complex licensing, high price-point features and complex integration patterns when working with productivity software, whether at home or at work. Content integration between applications is inadequate, for example, e-mail as a separate application, often integrates into many applications but never integrates the content composition & conversation process as part of a productivity paradigm, especially for the ad-hoc creation of content. The same applies to other forms of messaging (Voice, IM, Facebook).

Current content creation applications involve different types of documents with different applications to author them, forcing the user to deal with complex embedded editors (OLE, in-line editing) thereby preserving the present notion that the primary type of a document is limited to word document, spreadsheet, presentation, email or database. This results in complex software (multiple apps) to install, update, backup and maintain for even simple personal content workloads.

Currently available productivity suites, by their organization and use of multiple applications limit intuitive collaboration between users working on joint or individual content, across work, social and personal identities. But strong pervasive identity associated with content can differentiate work contexts (personal, pro-bono and professional projects) and establish intellectual property ownership.

Content creation and editing software on personal computers do not share common standards for the representation, storage and ownership of that content on local or Internet-based storage media. Content includes alphanumeric text, audio, images and video that play the role of notes, business or technical documents. Documents can also be created in various industry verticals such as Financial Services, Healthcare or Music and can represent domain-specific content such as scientific formulae, genetic models or music scores. These documents can be rendered on different devices for reading, printing or presentation. Content can also be created, edited or viewed across multiple mobile devices and e-book readers in addition to personal computers.

The different software application file formats and physical file storage of this content typically result in many copies of the same data being stored over time. Retrieval of the content is often based on specific versions of software used to create the content and format corruption or version aging can occur in content storage that results in content being lost or difficult to reuse in further editing activities. The user may need to use specialized tools at additional cost and data-loss risk or gain access to outdated or retired versions of software programs. The additional dependency of this software on specific versions of proprietary operating systems causes further risk of being unable to access content.

There is a need for more granular definition of the content creation process as documents for reading or presenting are not assembled at once but over time. This granular process needs to define a unit of content creation which can then be utilized as a means of constructing sophisticated documents for reading, printing and presenting. In this time-oriented process definition, there is a need for versioning controls that can track and manage the activity of a typical computer user in creating and assembling units of content into structured documents and presentations.

Further, this content is not always created by a single user in isolation but by the collaboration of many users across networked computers and mobile devices. there is a need for a content creation process that accommodates the collaborative editing activity of many users with the ability to produce multiple documents, represent different versions of documents from different users and different outcomes of collaborative activity resulting from a quorum of users agreeing to the final versions of individual pieces of content that constitute the document in question.

There is a need for storing more contextual metadata for content being created to allow the user(s) of that content to continue editing activities, identify areas of content editing, classify content better for retrieval and allow for greater security to be provisioned around different types of content.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

SUMMARY

This specification describes technologies relating to mechanisms for allowing collaboration between users in the creation and editing of content. In one exemplary embodiment, a method performed by a data processing apparatus comprises receiving a master object comprising metadata associating the master object with an owner entity and a content model identifying at least one content item, creating a branch object parented to the master object and associating the branch object with a collaborator that is different than the owner entity, the branch object including a snapshot of the master object at the time of the branch object creation, receiving changes to the branch object from the collaborator and recording the changes in a draft branch object that is parented to the branch object, receiving a submission of the draft branch object from the collaborator to the owner entity for review, generating a changeset by inspecting metadata of the submitted draft branch object for an identification of its parent branch object and, based on the identification of its parent branch object, comparing (a) current contents of the master object with (b) the snapshot of the master object at the time of the parent branch object creation and (c) contents of the submitted draft branch object, and presenting the changeset to the owner entity for approval.

In aspect, the branch object may be immutable.

In another aspect, the draft branch object includes a mutable copy of all content items referenced by the master object.

In yet another aspect, the changeset includes an indication of content deletion if the comparison reveals that particular content is present in the current contents of the master object and the snapshot of the master object at the time of the parent branch creation but not in the submitted draft branch object.

In still another aspect, the changeset includes an indication of changed content if the comparison reveals that particular content present in the submitted draft object is different from that particular content as it exists in the current contents of the master object, regardless of the state of any of the particular content present in the snapshot of the master object at the time of the parent branch creation.

In still another aspect, the changeset includes an indication of new content if the comparison reveals that particular content is present in the submitted draft object but not the current contents of the master object, regardless of whether the particular content is present in the snapshot of the master object at the time of the parent branch creation.

In still another aspect, the method further comprises identifying content proximate the new content in the submitted draft and, based on that identification, displaying the new content in the presentation of the changeset in the same proximity to any of the proximate content in the current contents of the master object.

In still another aspect, the method further comprises receiving a delegation from the owner entity of a second collaborator responsible for reviewing the changeset and, instead of presenting the changeset to the owner entity for approval, presenting the changeset to the second collaborator for approval.

In still another aspect, the creation of the branch object includes setting a status tag of the branch object to reflect its new status, the submission of the draft branch object includes setting the status tag of the branch object to reflect the submitted status of the draft branch object, and the generation of the changeset is triggered by the detection of the setting of the branch object's status flag to the submitted status.

In still another aspect, the method further comprises upon approval of a proposed change by the owner entity, creating a new version of the branch object with a new a snapshot of the master object reflecting the accepted proposed change.

In another exemplary embodiment, a method performed by a data processing apparatus comprises receiving a master object comprising metadata associating the master object with an owner entity and a content model identifying at least one content item, creating a first branch object parented to the master object and associating the first branch object with a first collaborator that is different than the owner entity, the first branch object including a snapshot of the master object at the time of the first branch object creation, receiving changes to the first branch object from the first collaborator and recording the changes in a draft first branch object that is parented to the first branch object, creating a second branch object parented to the master object and associating the second branch object with a second collaborator that is different than the owner entity and the first collaborator, the second branch object including a snapshot of the master object at the time of the second branch object creation, receiving changes to the second branch object from the second collaborator and recording the changes in a draft second branch object that is parented to the second branch object, receiving a submissions to the owner entity for review of the draft first branch object from the first collaborator and the draft second branch object from the second collaborator, generating a changeset associated with the draft first branch object by inspecting metadata of the submitted draft first branch object for an identification of its parent branch object and, based on the identification of its parent branch object, comparing (a) current contents of the master object with (b) the snapshot of the master object at the time of the parent first branch object creation and (c) contents of the submitted draft first branch object, generating a changeset associated with the draft second branch object by inspecting metadata of the submitted draft second branch object for an identification of its parent branch object and, based on the identification of its parent branch object, comparing (a) current contents of the master object with (d) the snapshot of the master object at the time of the parent second branch object creation and (e) contents of the submitted draft second branch object, and presenting the changesets to the owner entity for approval.

In one aspect, the method further comprises receiving an organizational hierarchy identifying the first collaborator as having more authority than the second collaborator, wherein the presentation of the changesets to the owner entity for approval includes, for any instance in which a conflict exists in the changesets between changes proposed by the first collaborator and changes proposed by the second collaborator, presenting the conflicting proposed changes made by the first collaborator and not presenting the conflicting changes proposed by the second collaborator.

In another aspect, the method further comprises receiving an organizational hierarchy identifying the first collaborator as having more authority than the second collaborator, wherein the presentation of the changesets to the owner entity for approval includes presenting the changeset associated with the draft first branch object before presenting the changeset associated with the draft second branch object.

In yet another aspect, the presentation of the changesets includes presenting proposed changes as they appear in the order of current content of the master object, regardless of whether the proposed changes were identified from the draft first branch object or the draft second branch object.

In still another aspect, the presentation of the changesets to the owner entity for approval includes, for any instance in which a conflict exists in the changesets between proposed changes identified from the draft first branch object and proposed changes identified from the draft second branch object, presenting the conflicting proposed changes in chronological order according to the time that the conflicting proposed changes were made to the relevant draft branch object, regardless of whether the conflicting proposed changes were identified from the draft first branch object or the draft second branch object.

In still another aspect, the presentation of the changesets to the owner entity for approval includes, for any instance in which a conflict exists in the changesets between proposed changes identified from the draft first branch object and proposed changes identified from the draft second branch object, presenting the conflicting proposed changes in chronological order according to the time that the draft branch objects from which the proposed changes were identified were submitted.

With any of the aspects described therein, a non-transitory, computer readable medium tangibly may embody instructions configured to cause a data processing apparatus to perform any of the methods described herein.

Similarly, with any of the aspects described herein, a data processing apparatus may be configured to perform any of the methods described herein.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The accompanying drawings illustrate various non-limiting, example, innovative aspects in accordance with the present descriptions.

DETAILED DESCRIPTION

Figure 1:
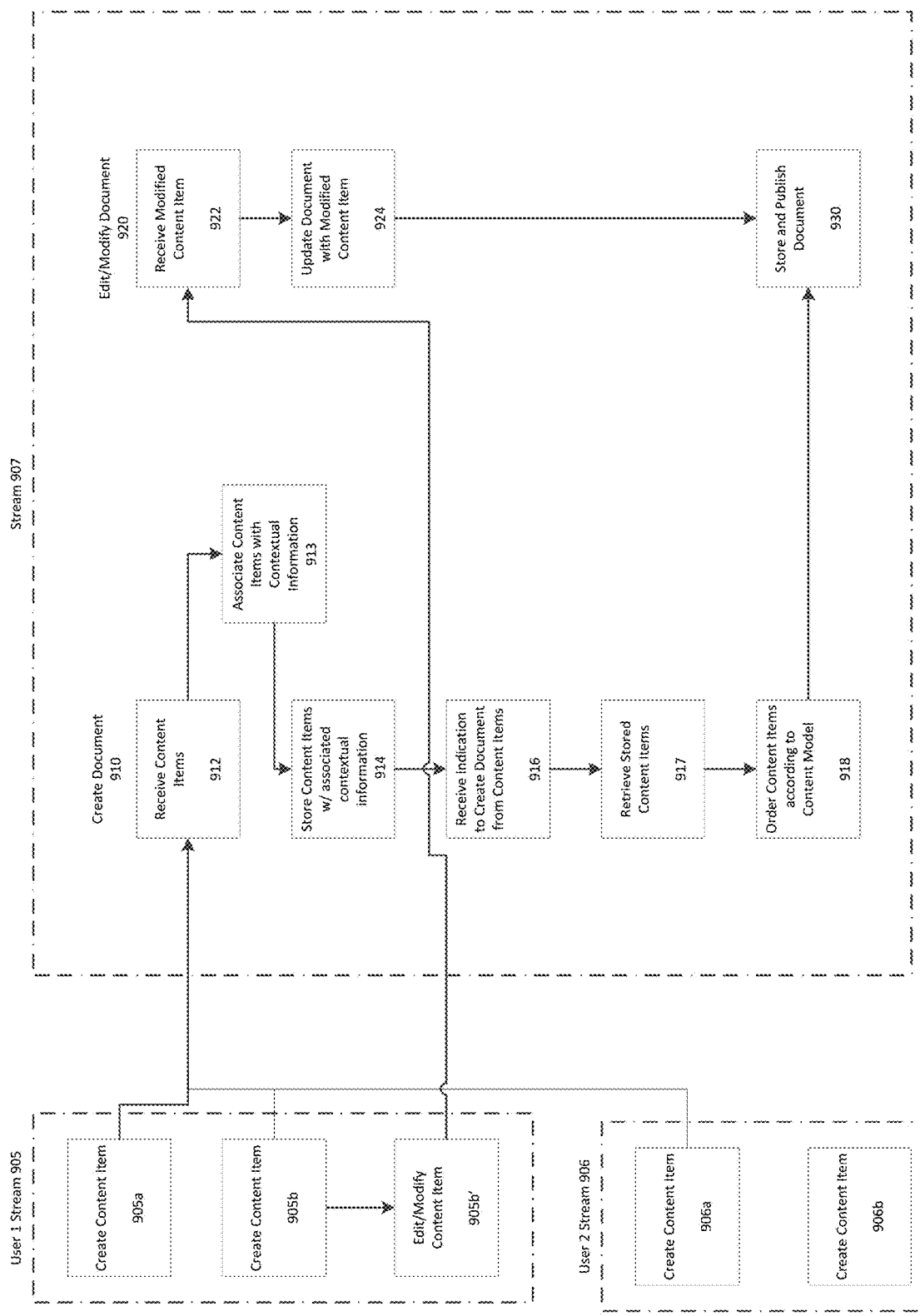
FIG. 1 illustrates a method of creating a document according to an exemplary implementation of the present disclosure.

Embodiments of systems and methods of content creation, versioning and publishing are described herein. While aspects of the described systems and methods of content creation, versioning and publishing can be implemented in any number of different configurations, the embodiments are described in the context of the following exemplary configurations. The descriptions and details of well-known components and structures are omitted for simplicity of the description.

The description and figures merely illustrate exemplary embodiments of the inventive systems and methods of content creation, versioning and publishing. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

INTRODUCTION

In general, one innovative aspect of the subject matter described in this specification can be embodied in methods that include the actions of creating a content item associated with a unique identity, associating a content model with the content item, assigning one or more tags to the content item or content model; selecting a content view style and publishing the content item in the content view style. Other embodiments of this aspect include corresponding systems, apparatus, and computer programs, configured to perform the actions of the methods, encoded on computer storage devices.

In one example implementation of the present disclosure a system and method of document creation manages content from the point of creation outside of any documents and files and then allows that content to be seamlessly utilized to create documents and presentations.

In yet another example implementation a system and method of document creation operates across multiple physical storage (local, cloud) and computing devices (mobile, tablet, laptop, desktop) belonging to a user and provide access to the content across those devices as a single, cohesive whole called a stream. The system and method allows the content from one user's Stream to be shared, collaboratively modified and co-mingled in a single document or presentation with content from one or more other users' streams across multiple devices. The system and method allows for automatic partitions & tracking of the way content is stored in each user's stream based on the type of data (Work, Personal, Social) and the computer accounts and identities involved in the creation of that data (A corporate login account, a personal cloud storage account etc.). The system and method manage the creation of content from different jobs within a single stream by allowing the user to associate identities and create logical containers (called Profiles) to help distinguish one type of content from the other.

In a further example content created in a stream can be licensed to and purchased from other users and organizations and which features the ability to be paid for the license through the stream enabled software and configure the terms under which the content is licensed (perpetual licenses, one-time licenses and annual subscription licenses).

In still a further example, a system and method of content and document creation allows the management of all content for an organization to be handled with the same features and flexibility as for individual users but allowing for the company content to be an aggregate of the content belonging to various organizational units (e.g. departments) and employee identities issued by that organization to various users. The system and method enables organizations to implement proprietary, on-premise stream enabled infrastructure, which provides a greater level of privacy and data ownership while integrating with a networked Stream Cloud for purposes of sharing/collaborating that go beyond organizational boundaries. The system and method enables content created in emails, instant messages and notes to be captured into stream-related activities, edited and expanded, and converted to content items in a document or presentation. The system and method allows for seamless transfer and cohesion of stream application state & the state of applications written to run inside the stream enabled platform across multiple devices and across networks.

In another example, a document created from content items within a stream comprises the following attributes and characteristics:

a. When importing an existing document, an exemplary system configured according to the present disclosure decomposes the content inside the document or presentation based on analysis of the narrative structure (sequence, paragraphs & associated headings and graphics) into a series of content items that in effect, preserve the ability to re-constitute that document accurately but now provide structure to the elements that comprise the narrative in a way that is not dependent on just formatting and visual styles.

b. Physical rendering modes to printer, file or screen can be applied intelligently to any set of content items constituting a document based on the purpose of the rendering mode—is it for reading, printing, presenting, mobile touchscreen or e-reader display etc.

c. Complex document structure can be achieved by nesting, sequencing and grouping content items via their headings. This applies to the narrative structure of both printable documents and presentations.

d. Document rendering is controlled through two sets of options (which can be independent of each other): styles and themes which control visual display and fonts/colors/backgrounds etc.; and options for presenting (such as whether slide notes should be allowed) or reading (such as display of a table of contents) which are specific to the rendering mode involved. It is important to highlight that document structure, styles and rendering mode options are all stored independent of each other and can be manipulated, depending on the context, by both viewers/readers of the content as well as the author(s).

e. There are many different types of content possible in the creation of a document since documents configured according to the present disclosure are primarily rendered in the browser, mobile device or computer using web-compatible technology which encompasses a wide variety of formats (audio, video, image, PDF, flash, markdown, XML, JSON etc.) and can be extended to support many others. The content item mechanism allows users to mix different types of media together to create a single document or presentation with the continued ability to use native editing tools to modify that content.

f. Each content item of a document has its own versioning mechanism and the document itself can store a snapshot of its current state as a version. This allows for very granular versioning visibility across content items and documents. Versions of content items are created automatically and organized by time. Versions of documents get created automatically whenever a document action such as printing, sharing or emailing is performed. The user can access the version by simply browsing the action history of that document. Users can also explicitly create a version or backup of a document or activity with the simple click of a button. Users can also create a version of a content item in a similar way, with the ability to tag that version with a friendly label for later retrieval.

Particular embodiments of the subject matter described in this specification can be implemented so as to realize one or more of the following advantages: A consistent, long-term method of storing content generated by an individual(s) that transcends machine boundaries & software licenses. The technology described herein allows end-users a way of centralizing and utilizing vast amounts of personal content that are currently locked inside of proprietary files and formats and which cannot easily be identified, searched and navigated; stream technology is a more natural way of dealing with intellectual property as it aligns the granularity of the storage and operations on content at the level of individual topics/concepts/thoughts. The technology described herein allows IP to be navigated, stored and retrieved in a more intuitive way as it uses association/relationships among granular objects (content items, pictures) and associated context to create and identify content. The technology described herein accounts for time and space (temporal geo-coordinates) in content storage which allows a natural user experience to be built that allows users to search and browse content on the basis of time and factoring in either physical location where the user is (at that time) or physical location where content was created. The technology described herein allows for quicker, easier and more powerful publishing of content by aligning the use of models in content creation as a key part of the content creation workflow. Models allow the system disclosed herein to leverage best practices, industry standards and technical methodologies in a way that is simple for the end-user but allows for very large and complex documents to be created over time. The technology described herein protects the IP of individuals, companies and governments. The stream implements granular security and access controls at the content item level allowing for protection (integrity, rights-to-use) of documents at a lower level of granularity than currently available without combining complex tools. The Stream Cloud acts as an arbitrator of content ownership for all content items that are published to the cloud. The technology described herein enables commercial interaction, within a single document, of multiple entities (individuals, companies, government entities) while preserving ownership, tracking contribution and ensuring that a fair compensation model can be implemented against the deliverables/documents produced in such manner. The technology described herein defines a limited number of real-world objects (content items, streams, users, companies, government entities) and then wraps metadata and associative relationships around those objects that allow users to style, present, re-visualize and share content. This allows for a more powerful way of using IP while simultaneously promoting the fidelity & re-use of the individual pieces of content (conceptual elements) that constitute that IP. The stream, with its content model approach, provides an open and dynamic platform for the creation of applications that manipulate content. In effect, the stream is a new base standard for the storage of arbitrary content that can be utilized by application developers to create a community of applications that can interact in new ways as content can truly flow freely between them. The technology described herein allows for separation of the applications that create and sequence content using context from the applications that can manipulate content for visual formatting, styles and subsequently, applications that modify content for printing. This allows for innovation and improvement in each type of application without presenting a user experience for end-users that interferes with clean content creation. It also allows best-of-breed applications and tools to be intermingled by the end-user in the content creation process. E.g. a market-leading graphics tool or technical modeling utility could be used conjunction with Streams to enable the end-user to do more with the content. And the use of credential contexts and profiles (buckets for sets of content) allows end-users to fundamentally separate content that is personal from content that is work-related or even social. This makes it easier for users to manage their content on their personal computers while allowing security and segregation to be applied to protect sensitive and confidential items. The technology described herein provides Internet content authors/publishers (such as celebrity blog writers) to protect their content and prove copyright ownership of their content in court. Finally, the technology described herein aligns the personal computing model for content creation and storage with the standards of the Web. This allows a user to naturally participate in Web publishing and easily create a powerful Internet presence that promotes that user, and allows the user to create a private and public content community on the Web.

Content Streams

A content stream, in an exemplary embodiment of the present disclosure, is a contiguous tag-based content flow using structured, temporal metadata to manage unstructured free-form HTML content snippets organized as a dynamic object graph. Content may include, but is not limited to, text, embedded audio, video and/or graphics. The use of a streams environment to manage and create data viewable in multiple formats is described in related U.S. patent application Ser. No. 14/212,823, filed Mar. 14, 2014, which is incorporated by reference in its entirety as if fully set forth herein. Many of the concepts discussed in the present application are discussed in greater detail in this related application, and the reader is respectfully directed there if an introductory background primer of those concepts is desired.

Content within a stream is stored effectively as a tag-based, schema-driven object graph, where the object primitives are usually one of the flowing object types: Content Items, Content Models, Document Views, Style Layers and Binary Objects.

Additional object types include, but are not limited to, Activities, Static Documents, Users, Organizations, Contacts, Messages, Events, Notes and Tasks.

In a content stream, any unstructured or structured content (such as the HTML snippet mentioned earlier) is encapsulated as an attribute of a Content Item object within the graph. A Content Item object, in the most general terms, is used to represent and store any type of content. A Content Item may be formatted in HTML, or may be formatted in any binary or textual format used for data serialization such images, proprietary content formats (such as computer CAD drawings or popular productivity suite formats like MS-Word and Adobe PDF) and custom textual encoding schemes (such as Markdown). Object relationships (such as parent-child relationships), links to other related objects and aggregations of objects are all used to express any arbitrary narrative path created by a sequence of Content Item objects and rendered using the structured or unstructured content within each item. Any additional metadata about the content encapsulated within the item (such as format extension types and format-specific metadata) is also stored in the Content Item object along with properties that can be used to control the algorithm(s) used to render the item to computer screens, mobile devices, message channels and printers.

Cardinality of Streams

There is only one stream per identity. Note that an identity may be associated with a User, Company or Government Entity that is the legal owner of a stream. Users do not create streams or organize them—streams are organized using contextual segmentation of content items. Consequently, there are no file and folder constructs within a stream. Contextual segmentation uses a user's identity, an activity label (implemented using tags) and timestamps to store and render groups of related content items within a particular stream. The segmentation is not meant to create a unique partition of the user's content akin to files and folders, where copies can exist but there is physical separation between different files, versions and formats used to store said copies. Streams are designed to handle all user content together at once.

The notion that there is only one (logical) stream per user is intended to stress that a stream is a logical construct that helps identify the legally-distinguishable real-world person or entity that can claim primary ownership of the content within that stream. There may be one or more physical stream instances (stored across one or more computers, mobile devices and servers) that, taken together, represent the logical extents of the stream.

As a stream helps to identify and track legal ownership of content over time, streams can consequently be created not just for people but also for organizations (legally registered) and for government entities (e.g. armed forces, government agencies) belonging to a country (ultimately aggregating into the stream representing the country itself).

Filtering and Context Activation

The stream uses filtering as the core mechanism of defining what content is being worked on, at a given time. The main filters that establish context are identity, activity, topic and time. When a context is initially selected by the user, it is activated and becomes the center of focus resulting in an immediate filtering of the stream to reflect just the content items that are in focus for that context.

Users typically contribute content into the streams in a set of activities that are 'current'. These represent what a user is thinking about or working on at present. Streams allow any piece of content (text, voice, picture, video) to be inserted into the stream against (i.e. in connection with) an activity, quickly and easily. This ensures that ad-hoc ideas and notes about a specific activity are immediately stored in a way that can be retrieved easily. This mechanism is augmented by a second 'positioning' mechanism described by the content model of that activity (see below for content models).

Binary Content References

Streams handle the storage and use of media and graphics within the textual content in much the same way that a web application optimizes the use of such resources across web-based page content. In this context, a user can import existing files from the user's file system or cloud share into a stream and organize the content using automatically-created representations (using text and icons), such as HTML representations—manifesting as objects in the user's stream graph—to help represent that content in the stream rather than dealing with the file-folder metaphor. Imported content maybe automatically transformed into HTML content and may use self-organizing algorithms to determine the best way to cross-reference the imported media files & graphics against the user's contexts and activities and create a visual index to enable the user to browse the content within the stream. Graphical content in streams typically follows a film-strip metaphor with a hover zoom effect to enable users to select and use graphical content.

Content Location Awareness

Stream content is geo-encoded, whenever possible. Contexts can have location affinity—a context can get activated by the presence of the user at a specific geo-location, or geo-location range or area. An exemplary system attempts to use standard location services provided by a user's computing device, if available, to help the user associate geo-locations against contexts. An exemplary system also allows users to refine geo-associations by adding user, company or organization, government entity, or other association identifiers against the tags. Sensitivity tags in the stream can be used to trigger visibility and rendering of content items when certain standard locations are involved—such as public places, home or work. Custom sensitivity profiles can also be created by the user for use in determining what filtering may need to be applied to the stream in case the user is working in a specific environment—for example lawyers that collaborate on certain cases cannot display confidential legal content across customer office locations they may visit, ensuring that no cross-sensitive information is visible.

Content Items

All content in streams is created in snippets called content items. Content comprises unstructured data and structured metadata such that content (e.g., expressive concepts created by the user) has associated metadata that identifies and contextualizes the other content within the content item. Every content item is uniquely identified globally and is anchored by a topic header. Content items can retain their core text & graphics, with minimal formatting, even when being utilized in different contexts and document views. This is a key feature of the stream workflow—content creation, content styling and content publishing are separate activities that are layered on top of or applied to content items. Content items are 'associated' with contexts (identities, activities) as well as views that are formatted for easy reading & sharing. To ensure that the user is not distracted by formatting, sequencing and partitioning (chapters, sections), content items have very basic formatting for the text and media (inline positioning, basic bulleted & numbered lists, etc.). Content items are visually arranged top-down by default with the ability for the user to select the visual style that works best—left-to-right, right-to-left, bottom-to-top etc. Content items have a focus view that consists of just the list of topics, each displayed with a brief note stating the core message of the content in that item, and arranged like index cards in the visual orientation the user finds easiest to read. The focus view can also form the basis of the table of contents for any document view being created from the relevant content items. The focus view acts as a checklist that can be displayed in a traveling side-bar—a visual style that ensures the content is easily visible while allowing the user to edit content items as usual. The focus view helps the user remember what the scope of the work remaining is, the 'location' of the current content being worked on against the full list of items that need to be produced and any additional notes that the user wanted to be reminded of per content item while working on the activity in scope.

Content items, and other stream object types, are implemented using a tag markup system. All content items, associations with views, styling instructions and metadata are stored in streams using tags that surround the content involved. The content itself is stored using a W3C-compliant HTML5 standard. Users can work at the content item level across collaborators, communication, document views, versioning and search. As there are no file boundaries or proprietary document formats (content is based on HTML), sending content to a collaborator is easy and can work for any recipient with access to a web browser.

In another embodiment, any arbitrary content (textual or binary) can be stored and encapsulated (by reference when required) by the content item object. Representations of the content are generated based on the context in which the content item is rendered. HTML is the default representation that is used for rendering—primarily in the context of a web browser or device browser toolkit (such as WebKit). However, arbitrary rendering formats can be used on other devices e.g. rendering to different printer formats, plotters or native mobile formats defined by a mobile operating system such as iOS or Android.

While the content encapsulated within a content item object can, in one embodiment of the system, be stored as HTML, the object itself can be serialized into physical stores using other data formats used to represent the schema of the content item object (e.g. JSON, SQL relational data, hierarchical data, object database schemas, object graph databases, data files). These formats can even be combined when storing objects and the object relationships/aggregations between sets of objects representing the state of the stream.

As all content is logically in a single, contiguous store and users can also perform global search and global editing operations on their content. A user could find out that they've misspelled the word "fallacy" for the last 8 years or so and fix it in every piece of content they ever produced, if they so desired.

The globally unique identifiers of content items also allow content items to be exchanged outside the streams system using communication channels, most notably email, and collaboratively refined. Content items have metadata associated with them to track editing time-stamps, versions & editing actions (such as applying or reversing rewrites on content items).

Content Models

Every document has an underlying semantic model that defines structure and purpose and allows the document to perform a productivity function. Examples might be a business proposal, a software architecture document, a term paper or even a novel. There is always a format and a minimal set of information elements that are required for the document to achieve the goal of its author(s), whether they are individuals, companies or other legal entities. The main difference in these models is the level of dependence on technical standards and methodologies in the subject domains of the document as opposed to individual choices made by the author(s) about the structure of the content. An exemplary embodiment of the present disclosure handles multiple aspects of this nature of content by providing the following behaviors:

1. Every document has a model. Not every model needs to be a document to offer value. Models are inherent in many things people do on a daily basis, without any immediate intent to publish outside of their own computing devices. For this reason, a model takes precedence over a document view in an exemplary object model. A model can be applied to a document view to structure the document but a user typically adds content into streams with just models and content items. The model is what converts the raw data/content into information.
2. A free-form document typically has a model that is best represented by the table of contents of the document. An exemplary embodiment of the present disclosure allows a user to structure a document view using a content model that could be entirely built by the user on the fly adding individual items to a content guide that helps track, author and sequence content items. These models can be saved as user-driven templates. However, technical standards and methodologies are made available to help correctly build content structure so that the document can achieve its purpose effectively.
3. An important aspect of the model is the creation of relationships between content items in the model wherein the relationships themselves are information. This is typically seen in more technical content models such as a software design model showing various parts of an application and their inter-relationship to create user value or medical information about a drug and the primary and secondary compounds that constitute the core of that particular drug.

Content models allow the typical streams user to do the following:

1. Contribute random bits of content into streams (in any order, at any time, about anything) and immediately position that content against an activity (context) AND a model element. E.g. If a user had an idea about how to creatively price a service for a customer, that particular idea would not only go into the Customer Proposal activity the user created (which will show up in recent activities) but since the Customer Proposal activity has an underlying model that states that it is a Business Proposal and has a model element for Pricing, the user can additionally target the Pricing element for this idea. This results in a proposal being built over time in a near automatic fashion since rendering the available content items in the content model for the proposal will generate a draft version of the proposal without additional effort. This method of work more closely aligns with how people think and function, multitasking over many activities at once, rather than forcing people to work the way document tools work.
2. Models allow the user to get help on creating a complete piece of information since the model provides cues on what items are more significant, what items are not completed yet (allowing for better task management) and what items can be rendered into a draft document view (marking completion state against individual model elements).

3. Models allow users to work collaboratively in a more meaningful and coordinated fashion. A team of users may choose to always have the same person(s) work on the pricing section of a proposal while another set of people may always work on the introduction and executive summaries of the proposal. A model could allow for content to be assembled from different streams while preserving the identity and ownership of the content against its author, allowing for remuneration and reward schemes to be implemented in different productivity scenarios.

Content models are structurally represented as a set of content elements called model entities (described by data elements and attributes akin to an XML schema), a set of relationships between entities (associations), a set of states and transitions for each entity type (publish status, completion, defunct data are examples) and a set of actions that can be triggered to change the state of the entity allowing for multi-user interaction with the model.

Selecting content to be presented or published together, sequencing that content (using topics to identify related text), choosing a flow layout for the content (a document flow or a presentation flow) and specific colors, fonts and other text styles are all activities that are layered on top of content items. This allows users to focus on developing the core message and then to spend time experimenting easily with the formatting and selection of available content in the creation of specific outputs, namely document views.

Storage and Time

There is only one stream per identity, which ensures a unique association of the user stream to the universe of content streams globally. Users, companies or organizations and government entities are the key levels at which streams may be created.

The only permanent association that a content item has is with the stream, and by natural extension, the identity, in which it originated.

Content items can be hidden using soft-delete (recycle bin metaphor) or hard delete (which removes it permanently). A permanent delete will not remove content items from rendered artifacts that may reference that content item but does remove it from document views that are marked 'dynamic' (which is the default). An exemplary embodiment of the present disclosure uses tags to add identifiers, topic headers, activity, identity & ownership, time, event & action metadata around the core HTML content within content items. A tag system can allow text regions (words, sentences) to be defined and marked-up with metadata in an infinitely overlapping fashion without affecting the original text visually. This allows the user to manipulate unstructured text by adding structured content around it, allowing for more powerful ways of positioning, formatting and visually rendering that text. More importantly, the tag system allows a stream engine to manipulate, multi-use and layer attributes (styling, display, sequence, priority/rating) on top of the original HTML content. Document views are assembled via association, not hierarchies/nesting of content items. Streams, identities, activities, content items, content item versions, messages, events, document views, temporal tags (actions, subscriptions) are all 'associated' through vector relationships with time that support bi-temporal resolution giving a truth-in-time perspective of the state of both a content item or a document view. The use of tags in the content storage is implemented as a compositing engine that does pre-processing of content items in different contexts to help the user interface render the version of the content that is expected. The compositing produces a resultant HTML content item and loads requisite metadata into the UI to support context-sensitive tools, schedule reminders, task notes, active related items (in-progress doc views) etc. Note that temporal tags may be used to insert deadlines and targeted end dates from a task management perspective.

In another embodiment of the system, metadata information is also represented as attributes of the stream objects involved (such as content items, activities, document views and content models). Tags can be serialized as single or many-valued attributes applied to an object and expressed in the format used to serialize the content and state of a particular stream object, where examples of the format include JSON, SQL relational data, data files or graph databases.

The work done by the compositing process is also used to create a temporal map of the content item that can be used for temporal browsing of the content (visual version history). Temporal tags are also inserted to trigger correlation processing of content items that may be waiting on an 'event'. Temporal tags are also inserted to trigger correlation processing of content items that may be waiting on an 'event'. The tags act as triggers to inspect correlation tokens and determine if an internal or external event has occurred that changes the state of that content item. For example, a content item may have been sent via email to a friend for a review of grammar and the event being waited on is an email reply to the original conversation with a modified version of the content or comments attached to it. This mechanism is the basis of the underlying content event system in an exemplary embodiment of the present disclosure. Another facet of the event system is the creation of subscriptions. A subscription is a recurring trigger for internal or external events that either update or create content. Internal events are those that happen inside the disclosed system, covering both individual user instances and a cloud back-end of the disclosed system. External events are those that the disclosed system is capable of capturing via standard protocols such as HTTP, IMAP, ATOM, RSS etc. Examples include: updated Wikipedia pages on a particular topic or new items in an RSS feed or a change to the first-page results of a Google search.

Identity, Context and Integration

Personal computer content is rarely tied to strong identity mechanisms. Modern platforms are starting to introduce new ways of associating Internet service accounts to personal computers (via the operating system) for the purposes of offering the inevitable cloud-sync service for files & folders. However, content is not dealt with at any sort of granular level in a way that reflects ownership, IP rules in effect (say, with the presence of a work contract with a company) and an awareness of the multiple internet identities required today for social computing and content sharing.

An exemplary embodiment of the present disclosure ties the user's content to the set of identities the user owns. This is primarily done using a user identity that then maps contexts & content to identities, including personal, social and work accounts. Identity is the major component of the disclosed system's contextual editing mechanism. Every piece of content created by the user has a default context—and thus a default identity—associated with it, that ties ownership back to the user. Identities can be issued to a streams user in much the same way a driver's license or corporate badge are issued. This provides a way to both get access to content that is shared or collaborated by the group, company or government entity as well as author content in a way that respects ownership of that content with the user while adhering to privacy and IP laws established by the parent streams entity involved.

An exemplary embodiment of the present disclosure can also track the use of personal content (in a fashion similar to the use of DRM in distributing music) and contribute that content (at the content item level) into other contexts, while tracing ownership.

An exemplary embodiment of the present disclosure also integrates with the prevalent identity providers for personal and social content, allowing users to publish/collaborate content in the context of those identities. Examples include Apple, Microsoft, Facebook, Twitter and LinkedIn. The integration with these identities accesses the directory and contacts associated with those identities in addition to the potential content that might be imported into the disclosed system via those identities.

By using the environment provided herein to create and manage content, users can input unstructured data, apply automatic and user defined associated structured data, and transform the content snippets to contextual representations of the unstructured data. The environment allows the contextual representations, such as published documents, reports, presentations, etc., to be transformed between various views without altering the unstructured data. The environment also allows for tracking versioning, authorship, licensing and other features due to the ability to associate the unstructured data with identity.

With reference to FIG. 1, a method of creating a document 910 from structured information and content associated with a user comprises the steps of: creating one or more content items (905a and 905b or 906a and 906b); receiving one or more content items from one or more users 912; associating the one or more content items with contextual information 913; storing the content items and associated contextual information 914; receiving an indication to create a document from the content items 916; retrieving the stored content items 917; ordering the content items according to a content model 918; and storing and publishing the document 930.

In some embodiments the content items (905a and 905b or 906a and 906b) which constitute the document to be created can be modified by one or more users, which in turn automatically updates the document with the new content. In creating a document, the method can be associated with each received content item with contextual information or metadata comprising information relating to the content item creator, the document creator, the stream(s) associated with the content item and/or document (e.g., streams 905 and 906), date and time of modifications to the content item, versions of the content item and/or document, or substantive contextual relation between content within the content item or between selected content items.

As described above, content items comprise unstructured and structured data associated with an identity, e.g., a stream, along with other tags or metadata to associate content items with other data, including other content items, events, streams, substantive context, or user defined criteria. Content items are not by themselves associated with a document type or file format. Instead, content items are file format agnostic. Content items can include alphanumeric data, audio data, graphical data, video data, or any other data type.

In the exemplary embodiment of FIG. 1, content items are created within two streams. Stream 905 can be associated with user 1 and stream 906 can be associated with a different user 2. In other embodiments, stream 905 may be associated with a first identity, for example a personal profile or personal stream, while stream 906 may be associated with a work or professional identity or work stream of the same individual. In still other embodiments, stream 905 may be associated with an individual user while stream 906 may be associated with an entity or organization, such as an organization that creates, stores, catalogs, or sells content items. Content items 905a and 905b are created within stream 905. Content items 906a and 906b are created within stream 906.

By creating content within a stream, ownership and control of the content is facilitated. For example, content items 905a and 905b may be created within a personal stream. As such the individual has ownership of the content items and underlying content. Also, content items 906b and 906b may be created within in an organization's stream so that the organization has ownership of the content. Ownership of content items allows the stream owner to control access, copying, and editing by other users, and facilitates versioning of documents having multiple authors or editors.

In the exemplary embodiment of FIG. 1, stream 907 may be the same as stream 905 or be an entirely new stream associated with a new user. In order to create a document using the content items created in streams 905 and 906, the user in stream 907 must retrieve the desired content items. Stream 907 receives content items 905a and 905b from stream 905 and content item 906a from stream 906. The three content items received form the substantive content that will constitute the document to be created.

In some exemplary embodiments, content items retrieved from a stream may be associated with a charge or credit to a user account. For example, in order to incorporate content item 906a into the document to be created in stream 907, a fee can be paid to an account associated with stream 906. In still further examples, content item 906a, or any content item, may be fully open to the public or restricted as to who may access it, or when or how it may be accessed.

By retrieving content items 905a, 905b, and 906a, metadata is created comprising contextual associations such that these content items are identified as related, constituting a document, or some other user specified tag or identifier. In the present exemplary embodiment, the system associates each content item received with contextual information 913. The content items are then stored with the contextual information 914. The content items can be stored locally, on a central or enterprise server, or within a networked or cloud based system. The content items can be stored with the associated metadata tags and identifiers, or in some embodiments, the associated metadata tags or identifiers can be stored separately with instructions where to find the specific content item referenced.

In some embodiments the steps of associating content items with contextual information 913 and storing the content items with the contextual information 914 can be done as part of a backend networked service or locally with a local server application.

In some examples, content items represent a data structure for storing data on a computer readable medium. The content item data structure comprises unstructured and structured information. The unstructured information typically pertains to a topic, theme, subject matter or user specified category. An example of unstructured information is the textual body of a letter. The structured information provides context for the unstructured information. The structured information may comprise, for example, heading information, user information, stream information, time of creation or modification of the unstructured information, version information, reference information for resources stored externally to the content item, such as a webpage or graphics, or any other user defined contextual information. In some embodiments, the structured information can be associated with the structured information automatically or manually input.

In the exemplary embodiment of the FIG. 1, the system receives a user prompt to create a document from the content items selected 916. The system retrieves the content items 917 and orders the content items according to a content model 918.

Content models represent preset structure and formatting on how to order and present content within a content item and between content items. For example, a content model may set forth the content items in sequential order in a textual format compatible with an e-mail, a memo, a letter, etc. Or the content model may present the content items in an outline format, or perhaps in slides for a presentation. Content models can be predefined and selected from a menu, or content models can be user defined. In some embodiments, content models can be obtained from other streams on an open or restricted basis. For example, content models can include company specific document layouts. In other examples, users can purchase content models from content model producers.

Once the content items are ordered, the document and associated ordered content items are stored within the stream and published 930.

The published document does not necessarily have to be static in its presentation to the reader. Content models allow a document to be dynamic. For example, a user reading a document having a content model setting forth content items as a memo can change the content model to set forth content items as a hierarchical outline, or a slide presentation. This ability to restructure a document without substantively changing the content allows not only the author to choose how to present the content but also gives the reader some control over how the content is presented to and consumed by the audience or intended reader.

In an exemplary embodiment, the document comprises content items, at least in part, created within other streams. The metadata tags and associated identifiers that accompanying the content items comprising the document facilitate tracking the content item to its original source or author. This makes updating documents based on edited or modified content items easier. For example, the document described above with respect to FIG. 1 includes content item 905*b*. Should the user update, edit or otherwise modify the content in content item 905*b*, a modified content item 905*b'* is created. The document published in stream 907 is then also edited or modified 920 whereby the disclosed system receives 922 the updated content item 905*b'* and updates 924 the content within the document. The document is then stored and published 930 with the updated content item 905*b'*.

In some embodiments, the author of the document to be updated with the modified content item 905*b'* can be prompted to allow the modification in the document. In other examples, the modification can be automatic. In still further exemplary embodiments, the original document can be stored and archived as a static first version of the document and the updated document can be stored and archived as a static second version of the document. Edits and modifications, as well as original contributions of the content are easily attributable to a user as the content item is always associated with a specific user stream.

It will be appreciated that a document can be reconfigured by selection of a new content model. In this manner, a user can switch between multiple document formats, (e.g., memo to presentation, or e-mail to formal letter) without having to recreate the same content saved over multiple files and file formats. This frees the user from the traditional structure of documents specified and saved as file types with multiple copies of the same or analogous substantive content.

Figure 2:
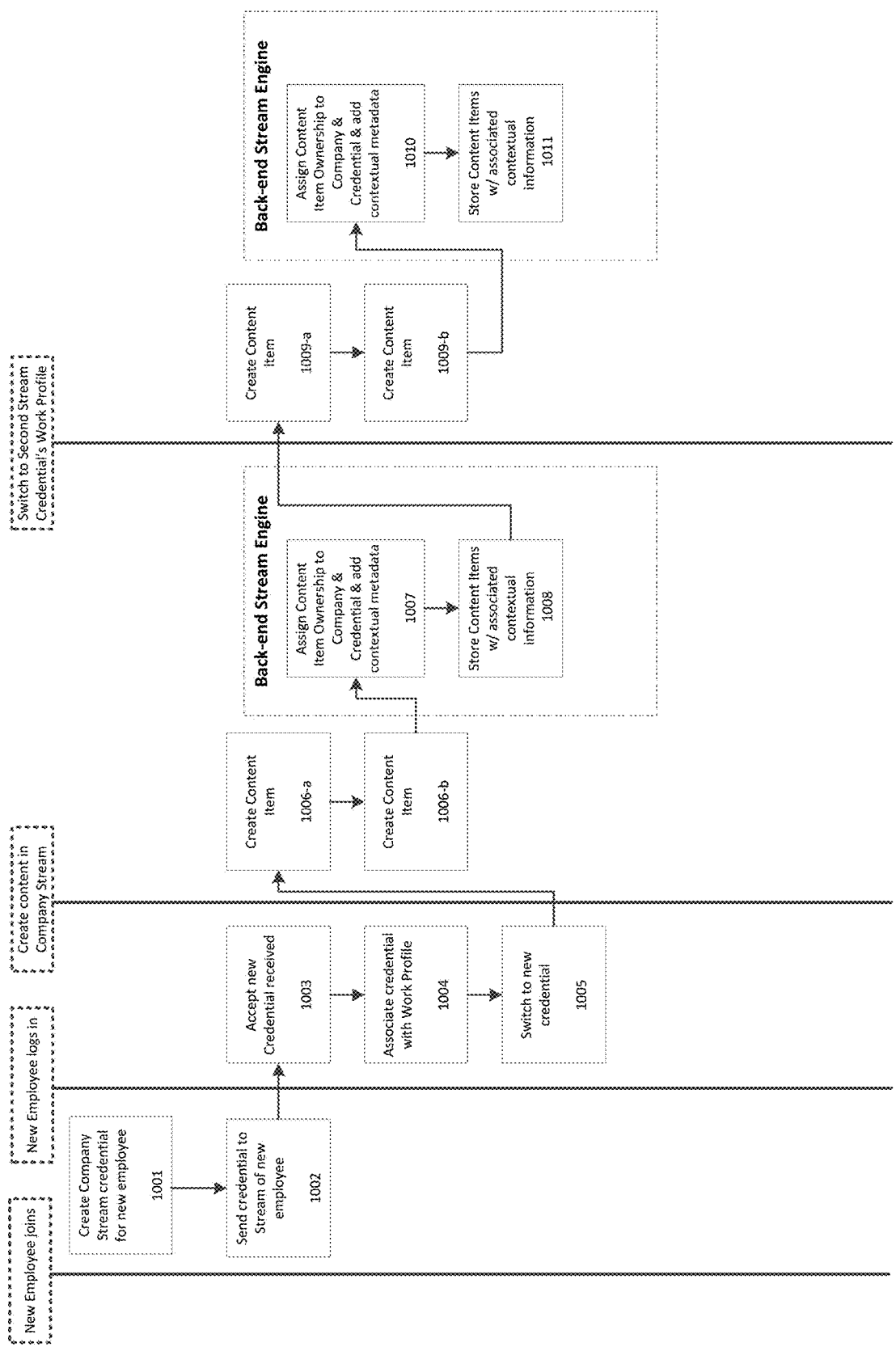
FIG. 2 illustrates a method of managing user identity and profile switching according to an exemplary implementation of the present disclosure.

With reference to FIG. 2, an example method is illustrated for managing user identity and profile switching within the environment of an exemplary embodiment of the present disclosure. As previously discussed, a stream contains the content, in the form of content items, attributable to an entity, either an individual or an organization. Streams and the associated identity facilitate ownership of content and allow users to control access to the content by various users within or external to an organization. That is, the stream owner can determine who may access, modify or copy the content within the stream. Moreover, users can create content on the organizational stream and then move to an individual workplace stream and back to the organizational stream with ease. Or in another example, a user within a company or organizational stream can create or edit content, then, a second user can create or edit content within the company or organizational stream, wherein the content created is associated with the first and second user credentials and the company stream.

As illustrated in FIG. 2, when a new user or employee joins an organization, a new organizational or company stream credential is created 1001. The credential identifies the user as an accredited user within the company stream. The credential is sent to the employee's individual stream 1002. With the credential, and their individual stream, the employee can log into the company stream, at which point the new credential is accepted 1003 and associated with an employee work profile 1004. The company stream then switches to the new credential 1005 such that content created or edited within the company stream is then associated with the employee credential. In this manner, authorship and document control can be facilitated. For example, the employee creating the content within the company stream can have (or be assigned) authorship and control of the content items or the company can assign control elsewhere. The employee can create content in the form of content items (e.g., 1006*a* and 1006*b*) within the company stream. A back-end stream engine assigns the content item ownership to the company and employee credential, along with adding other contextual metadata 1007. The back-end stream engine also stores the content items and metadata 1008.

Additional content can be created by a different user having a different credential. In such an example, a second user accesses or logs into the company stream and creates content items (e.g., 1009*a* and 1009*b*). The back-end stream engine assigns the content item ownership to the company and the second employee's credential, along with other contextual metadata 1010. The back-end stream engine also stores the content items and metadata 1011.

In some exemplary embodiments content items may be viewed, edited, modified or created in a company stream by more than one user simultaneously.

Figure 3:
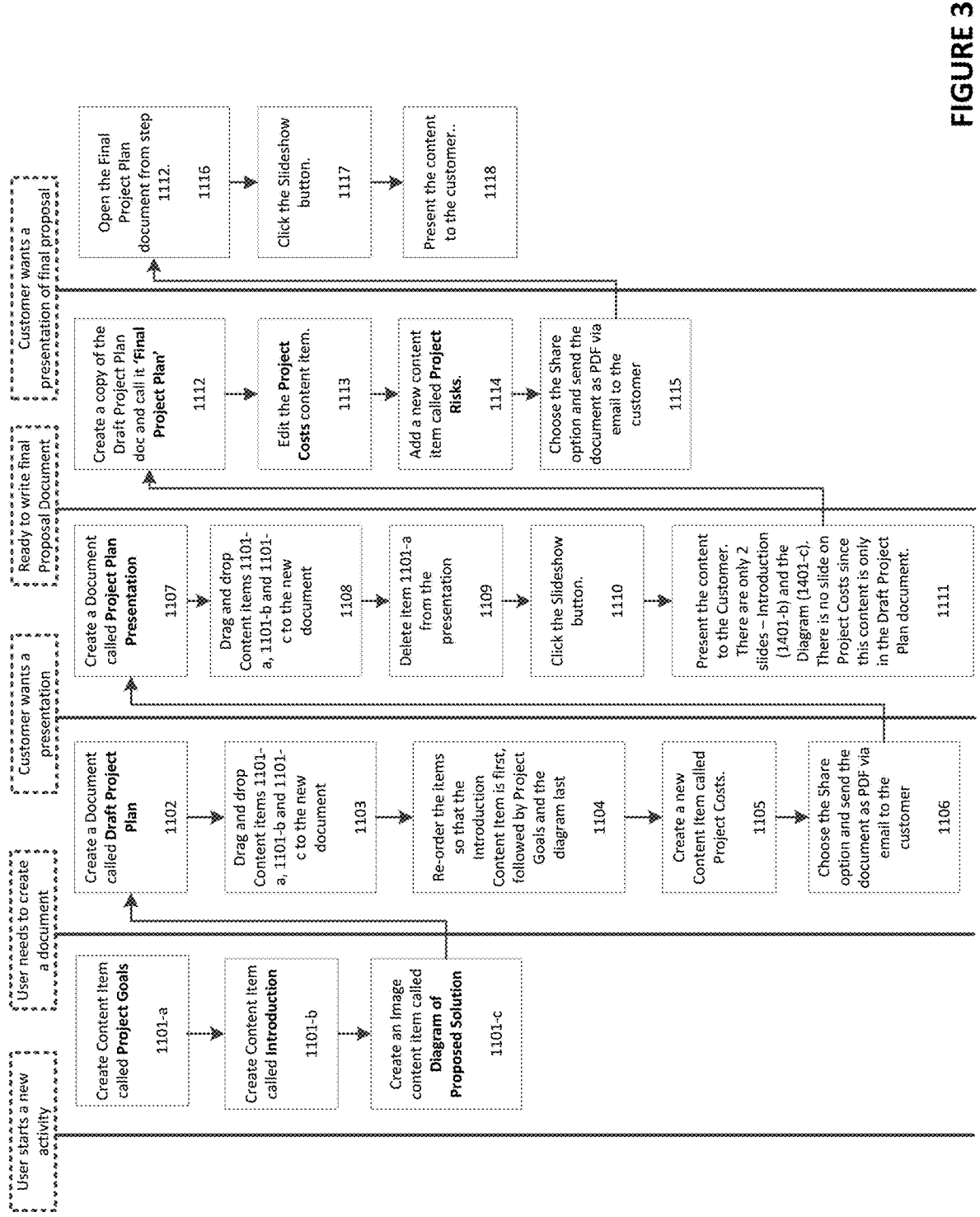
FIG. 3 illustrates a method of creating documents from content items within a stream and re-using the content items for a specific activity according to an exemplary implementation of the present disclosure.

FIG. 3 illustrates an exemplary method of creating documents from content items within a stream and re-using the content items for a specific activity. The method includes creating multiple content items, placing the content items into a document, reordering the content items, and publishing the document. The method further includes switching the document format between two different formats, both having the same content items.

In FIG. 3, a user in a stream starts a new activity for a particular project and, for example, creates three content items. The user first creates a content item called Project Goals 1101a. Then the user creates a content item called Introduction 1101b. And then the user creates an image content item called Diagram of Proposed Solution 1101c.

From the three content items created, the user then creates a document called Draft Project Plan 1102. Via a user interface associated with the user's stream the user can drag and drop content items 1101a-c to the new document 1103, thereby creating the document and populating it with content in the form of content items. The content items can easily be re-ordered 1104, for example so that the Introduction 1101b is first in the document, followed by the project goals 1101a and finally the diagram 1101c.

The user can then create a new content item called Project Costs 1105 and add this to the document.

The document can be published and shared with other users. For example, via a user interface associated with the user's stream, the user can send the document as a PDF via e-mail to a customer 1106. In some exemplary embodiments of the invention, the user interface associated with the user stream can be integrated with or operable with e-mail systems.

Continuing with the example of FIG. 3, the Draft Project Plan document 1102 can be reformatted as a slideshow presentation. A document is created called Project Plan Presentation 1107. Via a user interface associated with the user's stream, the user can drag and drop content items 1101a-c to the new document 1108, thereby creating the document and populating it with content in the form of content items. The user can edit the document, for example, content item 1101a can be deleted from the presentation 1109. With the user interface associated with the user's stream, the user selects a Slideshow button on the user interface 1110 and the content items in the document are formatted as a slideshow presentation 1111 having only two content items 1101b and 1101c. The user can create a copy of the Draft Project Plan 1102, calling it "Final Project Plan" 1112. In the present example, the Final Project Plan 1112 includes content items 1101a-c, and 1105. The Project Plan Presentation 1107 only includes content items 1101b and 1101c.

Separate from the documents created, the user can edit 1113 the content item called Project Costs 1105. This will update the documents Draft Project Plan 1102 and Final Project Plan 1112. The user can add a new content item called Project Risks 1114 to the Final Project Plan document 1112. The user can send the Final Project Plan 1112 to the customer as a PDF via e-mail 1115 or as a link that opens the plan in a streams enabled user interface. Upon receipt of the Final Project Plan 1112, if the customer chooses to open the document in a streams enabled user interface 1116, the customer can then choose to reformat the document by selecting the slideshow presentation 1117 which displays the document Final Project Plan as a slideshow 1118 (which, for example, may be the Project Plan Presentation 1107 or a slideshow content view style of the Final Project Plan).

Figure 4:
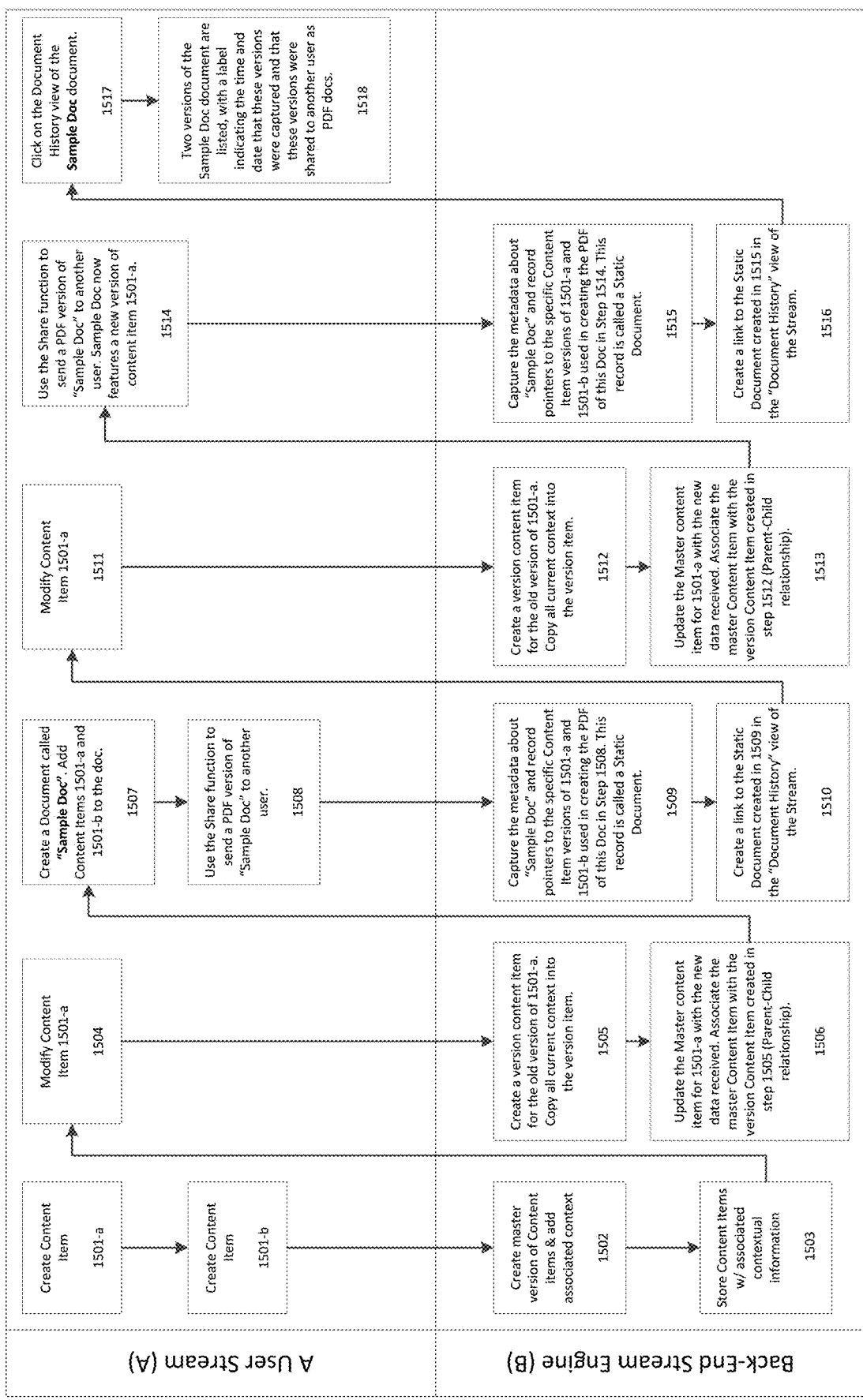
FIG. 4 illustrates a method of document creation using versioning and static documents according to an exemplary implementation of the present disclosure.

FIG. 4 illustrates a method of document creation using versioning and static documents. In the illustrated method, a user creates content items 1501a and 1501b via a streams enabled device, such as a personal computer, a networked terminal, a laptop, tablet or mobile device. The back-end stream engine creates a master version of the content items and adds associated contextual information and metadata 1502. The back-end stream engine stores the content items and associated contextual information 1503.

The user can then modify or edit any of the content items, for example the user may modify content item 1501a via a streams enabled interface 1504. The back-end stream engine creates a version content item for the old, unmodified version of content item 1501a and copies all current context into the version content item 1505. The stream engine updates the master content item 1506 with the new modification data received and associates the master content item with the older version content item, creating a parent-child relationship between the version content item and the master content item.

The user then may create a document 1507 called "Sample Doc" and add content items 1501a and 1501b to the document via the streams enabled interface. Using the Share function of the streams enabled interface, the user can send a PDF version of the "Sample Doc" to another user 1508. The back-end streams engine captures the metadata 1509 associated with "Sample Doc" and records pointers to the specific content items versions of 1501a and 1501b used in creating the PDF of the document, thereby identifying a static document dependent on versions of content items. A link to the static document can be created 1510 in the streams enabled interface which shows the Document History, or versions of the document within the stream.

Should the user then modify content item 1501a via the streams interface 1511, the stream engine creates a version content item for the old version of content item 1501a and copies all current context into the version content item 1512. The stream engine updates the master content item 1513 with the new modification data received and associates the master content item with the newer version content item, creating a parent-child relationship between the version content item and the master content item.

The user can then share the updated version of "Sample Doc" with another user 1514. The back-end streams engine captures the metadata 1515 associated with "Sample Doc" and records pointers to the specific content items versions of 1501a (as modified in 1511) and 1501b used in creating the PDF of the document, thereby identifying a static document dependent on versions of content items. A link to the static document can be created 1516 in the streams enabled interface which shows the document history, or versions of the document within the stream.

The user can click on the document history view within the streams user interface 1517 and two versions of the "Sample Doc" will be listed 1518 with a label indicating the time and date that the versions of the document and content items were captured and that the versions were shared to another user as PDF documents.

In this manner, the streams engine records when content items and documents are created, edited or modified, maintains a history of versions of content items and documents, and who shared, viewed or had access to the content items or documents.

Example: Content Workflow Case Study Using Streams

This section describes a detailed case study for how content is authored using the mechanisms and features of an exemplary embodiment of the present disclosure.

BACKGROUND

The case study involves the creation of a work proposal for a potential customer, a company called XYZ, detailing the delivery of a technology solution capable of enabling the XYZ company website to be revamped. The new site is to allow visitors to the website to register for a personal account, order products online and have them fulfilled by XYZ. The current website is several years old and does not feature any such capability. The people involved in this scenario are identified in Table 1 below.

TABLE 1

| User | Role | Comments |
| --- | --- | --- |
| Stream_MainUser | Main lead on the authoring of the proposal. | This case study begins as content in the stream belonging to this user. |
| Stream_TechUser | Technical lead on scoping out and providing a solution to the technical requirements of the customer. | The technical lead will contribute entire sections of the work proposal from his/her stream in this case study. |
| Stream_FinancialUser | Person that helps the Stream_MainUser figure out how to estimate the price of this solution for the customer. | This user has developed financial content that can be used to build the pricing section of the work proposal being written. |
| Customer Lead | The main contact at the XYZ company that is responsible for vetting and signing the work proposal for the new web site. | This could be a user that could lead a whole team of people at the customer company, XYZ. In this scenario, this user could represent an individual that is a sole proprietor and wants to build a new website. |

This scenario illustrates core stages of a content production process that are not specific to any vertical scenario—such as the website proposal used here which is specific to the Software Development industry—but can be leveraged across all types of content creation activities. Similarly, the organizational boundaries in this use case, which features a customer organization and a team of people that could be working for the same company and proposing a solution to the customer's website needs, can be substituted with sole proprietorships, individual consultants, pro bono teams from social networks and individuals alike.

Initiating the Activity for a New Work Proposal

The scenario begins with a conversation at the office in Manhattan, NYC of XYZ corporation between the Customer Lead and the Stream_MainUser. At the start of the conversation, Stream_MainUser opens a streams enabled client (for example, built with the Content Stream Engine included) and an activity gets created with geo-coordinates embedded into the activity header that reflect the location where that activity was started. The activity title is set to "Web Site Proposal for XYZ" by the Stream_MainUser. At the start of the conversation, the activity is a simple activity that has a default "ad-hoc" content model—this implies that the activity has zero content items or suggested topics in the focus guide and is expected to be authored from scratch by Stream_MainUser. Stream_MainUser also starts typing notes from the conversation into a content item as the Customer Lead talks about the requirements for a new web site. After the initial conversation, Stream_MainUser spends time the next day to review the content item with the notes from the requirements. When Stream_MainUser opens the streams enabled client the next day, a list of current activities under the Work profile includes the newly created Web Site Proposal activity created on-site the previous day. Clicking on the activity opens the stream view editor and automatically scrolls the view to the last content item and line being edited.

Structure of the Proposal

At this point, Stream_MainUser realizes that the activity will produce a Web Site Work Proposal and proceeds to do a search of the available content models in the streams enabled client. Stream_MainUser finds a content model that reflects a technical proposal of work for building a web site and selects that content model to be applied to the XYZ activity. As soon as this is done, the focus guide gets populated with a number of content item placeholders identified by a set of suggested topic headings and attached notes for each heading, reflecting what the content item is about. This is the core of a model definition in the stream engine—namely, its content schema.

The newly selected model for the Web Site Proposal features the following list of content items in the focus guide:

1. Introduction
2. Customer Requirements for the Web Site
3. Proposed Solution
4. Technical Architecture of the Solution (nested model)
5. Proposed Costs and Resources (nested model)
6. Licensing Terms of the Software Solution Stream_MainUser also finds that the current model selected for the XYZ activity allows for flexible editing of the content schema (headings & sequence of top-level content items)—other models can be designed to insist on specific pre-defined headings and structure as part of industry technical standards or regulatory requirements for the type of activity in question.

Collaborating with the Customer

The streams enabled client also allows Stream_MainUser to send an email to the Customer Lead with the proposal model (including sample text). The email includes a hyperlink that is configured to allow the Customer Lead to register on a Stream Cloud as a recipient of stream content (assuming the Customer Lead is not already registered). This allows the Customer Lead to login and view content such as the model of the proposal and comment collaboratively on the model. This also allows the Customer Lead to propose additional sections to the proposal that may not have been featured in the original model.

Whenever visiting the Stream Cloud collaboration site, the Customer Lead is shown a home page that summarizes all activities that are currently active in collaboration with Stream_MainUser as well as an Activity landing page that shows currently active collaboration items such as the Proposal model. Stream_MainUser can share draft content items as well as allow the Customer Lead annotation and append rights on appropriate content items. The edits that the Customer Lead makes are received as events in the Stream Client of Stream_MainUser and various operations can then be chosen such as merge edits, append additional text and read annotations/feedback on existing content.

Collaborating with Internal & Virtual Teams

The model selected for the Web Site proposal activity also suggests to Stream_MainUser that there are a number of different types of content areas of the proposal by offering a Team Setup option in the focus guide. The model features a suggested list of roles of team members required to write the proposal. Note that this acts as a starter for the Team Setup option—Stream_MainUser can configure as many or as few other collaborators as required for the proposal activity. Currently, there is only one person (Stream_MainUser) configured as the owner of the activity. Again, regulatory rules could be applicable in the model and require the participation of specific role or even specific people, most notably, in corporate usage scenarios where legal department or PR department inclusion may be mandated for certain activities.

Stream_MainUser decides to involve a web technology specialist, Stream_TechUser, as part of the team. Stream_TechUser is from a different organization that is often sub-contracted by Stream_MainUser for specific technology projects. Stream_TechUser is a registered streams account holder and receives the invite from Stream_MainUser displayed by the streams enabled client and accepts the invite to become a part of the team. Stream_MainUser also adds a billing specialist, Stream_FinancialUser, to the team.

At this point, Stream_MainUser assigns ownership of different sections of the proposal to different users as follows:

TABLE 2

| Content Item | Owner |
| --- | --- |
| Introduction | Stream_MainUser |
| Customer Requirements for the Web Site | Stream_MainUser |
| Proposed Solution | Stream_MainUser |
| Technical Architecture of Solution (nested model) | Stream_TechUser |
| Proposed Costs and Resources (nested model) | Stream_FinancialUser |
| Licensing Terms of the Software Solution | Stream_MainUser |

Note that content from Stream_TechUser is owned by a different organization (or Stream_TechUser as the case may be) and is integrated into the activity view of Stream_MainUser via a method called Compositing where the stream engine can display linked and referenced content items in real-time across users, companies and activities. When ownership of the Technical Architecture content item is assigned to Stream_TechUser, the content item transitions from a placeholder in the model (since at this point, it is empty except for sample content) to a linked content item from the stream belonging to Stream_TechUser. The content item gets created in Stream_TechUser's stream automatically using context and model information received from the original activity in Stream_MainUser's stream. However, this content item is created with a globally unique identifier that maps ownership to Stream_TechUser. Stream_TechUser then effectively licenses use of that content item under terms that exist between the two organizations (Stream_MainUser's and Stream_TechUser's—if they are separate organizations) or that may be set up for just that activity.

Using tag markup, the content item that Stream_TechUser works on includes model information received from Stream_MainUser that ensures that a consistent technical model is applied to the description of the technology to be used to build the new web site for XYZ. Another important feature is that Stream_TechUser has read-only access to other content items in the activity that the technical role assigned requires from the proposal activity. In this scenario, Stream_TechUser is able to view in real-time, read-only copies of the Introduction, Customer Requirements and Proposed Solution content items from the main activity.

Gradually Building a Draft

Stream_MainUser finds that there are a few more people at XYZ that need to be met as part of ensuring that pertinent information relating to the web site requirements is gathered. On the second visit to the Manhattan office of XYZ, Stream_MainUser starts the streams enabled client application and is prompted to automatically switch to the Web Site Proposal activity since it maps very closely in geo-coordinates to the creation location of the activity. In addition, there is an option to automatically open this activity when within a specified range of this office.

In each subsequent meeting with the customer, Stream_MainUser has the option to rapidly create content items or append to content items in different sections of the model. For example, while driving, an idea relating to billing might occur to Stream_MainUser. At this point, a mobile streams enabled client could be activated with a quick-create option which would allow the user to dictate a note and would then allow the user to confirm where to append the note by transliteration of the current model elements—Introduction, Customer Requirements, Billing, etc. One of the key aspects of context-driven startup in the present disclosure is the ability for the user to context-switch rapidly (mid-conversation for example) and map new content (such as a voice note) against both an activity and a content item to ensure that information is captured in the right context for subsequent retrieval and review. This context-based creation of content can be applied to content from emails, chat conversations and online web conferences which allows the draft of the content to be created over time in an incremental, collaborative fashion.

The streams enabled client also may use an embedded identifier in emails wherein a content item is sent to a collaborator that intends to reply by email. Any replies with that identifier can then be processed automatically by the streams enabled client and the data in the response can be added as inbound content or modification data against that content item.

The focus guide also plays a critical role in the creation of the draft proposal since it acts as an aggregator of progress, status and events for work being done in each content item of the model. The activity owner (Stream_MainUser) and the owner of the individual content item can both add tracking data to the header of the content item that is then used to display agreement on expected due dates, individual tasks involved in completing the content in that content item as well as percentage complete and other data that can be tracked against both the item and any associated tasks. This information often flows from multiple streams that synchronize the status of the content items across different stream enabled clients to ensure that a consistent set of data points is displayed. This allows Stream_MainUser to have a clear sense of progress being made against individual pieces of content and allows sharing of this status information in updates to the Customer Lead.

Using Textual Content References

Stream_MainUser inspects the list of content items that need to be done and identifies that the Licensing Terms content item can be populated from a boilerplate reference that is available for these terms. Stream_MainUser will perform a quick search to identify the appropriate textual reference in much the same way an inline model search was performed at the start of the activity. The selected textual reference can be used in a number of ways:
1. If the text is ready to be used as-is, it can simply be inserted into the content item. Text used in this manner is linked into the content item—a reference to the original content item is used to populate the text. This ensures that if there are updates or changes to the original content, Stream_MainUser will be notified that these terms or policies have changed and affect the way the proposal is being created. Such notifications can also be applied to proposals previously created to perform an impact analysis on any active contracts with customers such as XYZ. Stream_MainUser can also do a quick spatial search and display a visual graph of all references used by the current activity in the stream or all activities in the stream that currently use the same textual reference.
2. Textual references can include a list of variables for text substitution that can be filled prior to inserting the item. An example of a variable could be the name of the company (XYZ in this case) involved to whom the terms are addressed.
3. A textual reference from a previously written content item from another activity within the user's stream can be used too. Stream_MainUser may perform a 'sanitize' operation on the text using the stream enabled interface which ensures that any entities recognized as real-world organizations, people, countries, prices etc. in the text can be listed and either removed or substituted by Stream_MainUser prior to inserting the content into the target content item. Content inserted in this fashion is a copy of the original content and not a dynamically linked reference.

During the week that the first draft of the proposal was being put together, Stream_MainUser received a visual alert that the boilerplate used for the Licensing Terms section of the draft proposal had been revised with newer and more stringent legal terms and it was recommended that the newer text be used in any proposals in progress. By selecting the 'Update Content Reference' option in the Licensing Terms content item, the item is regenerated to the newer version. Version history and side-by-side comparison options in the stream enabled client and Stream Cloud allow both internal team members and the Customer Lead to inspect the changes.

Using Content Model References

Some of the content items are themselves nested content models with relationships and references encoded into their structure—in this case, the Technology Architecture section features a software architecture content model that describes the use cases, database design, software components and web server deployment facets of the proposed new site. A nested content model is not hierarchical in the true sense of the term—nested content models feature content items at the same level as the parent. The difference is that the content items are grouped together by association with (a) the parent content model they are a part of and (b) relationships with each other defined by the user.

Each of these elements is inter-related as a single Use case can map to related elements of the software, database and physical deployment. The Technical Architecture model makes those relationships explicitly available—the user can choose what items are related to what in the model. In our example, Stream_TechUser can create a Use Case content item for the display of a catalog of products that can be purchased online in the new website. This content item in the Technical Architecture model can have optional relationships with content items that represent database elements, software components and physical servers that host these assets. In our example, Stream_TechUser may associate the 'Display Catalog of Products' use case with a data model content item showing Catalog tables within the Web Site database, as well as a set of software classes that are used to implement the functionality of catalog creation, maintenance, search, retrieval and display. This allows technical reviewers in XYZ that the Customer Lead may choose to share the proposal with an ability to walk through the document and click through references between related elements that represent more complex information than simple hyperlinks since these references can have metadata associated with them (defined in the content model) and filled out by Stream_TechUser to help provide as much useful and context-sensitive information as possible to describe each technical component of the proposed solution.

Using Computational Models for Pricing

Stream_FinancialUser can also use a nested model in the creation of the Proposed Costs and Resources content item within the proposal. This model could involve tabular content that represents a computational model for prices and features a row-column interface for entering information to calculate costs based on the type of work involved. In this case, since the model involved is a Web Site Development model, the model allows Stream_FinancialUser to select from 2 computational models that have previously been setup—one that involves a fixed-price approach to the work and the other that features a variable rate with a percentage of tolerance on the final amount. Stream_FinancialUser can select either model and insert it into the Proposed Costs and Resources content item.

Sharing Automated Internal Drafts

As all content is typically inserted against specific content items within each activity, the notes, emails, chat and discussion minutes from the team members are all captured and stored against the appropriate portions of the content model. This allows a stream enabled client to render a draft of all the information available automatically without any additional help in collating, copy-paste or other forms of information aggregation. Such drafts would typically be shared for internal consumption of the team prior to refining the content items to the extent that a draft can be submitted to the Customer Lead. The value for Stream_MainUser is that, at any time, an immediate draft of all current content on the proposal is available for review or sharing. This is on account of the contextual nature of storage of content in a system configured according to the present disclosure and the ability to composite a resultant activity from distributed content items across different streams (users).

Assembling Interim Presentations for the Customer

The Customer Lead indicates to Stream_MainUser that the senior management at XYZ would like a summary presentation of the current proposal to ensure that it was to their collective liking. Stream_MainUser then polls the focus guide to review the completion status of all the team members involved and determine which content items could be represented in the interim presentation for the XYZ management team. Stream_MainUser decides that the Introduction, Customer Requirements and Proposed Solution content items are ready to be summarized in presentation and selects these three content items and clicks on the 'Create Document View' option. The document view dialog then asks how the document view is to be formatted—for reading or for presentation. Stream_MainUser selects presentation and is then directed into the Document View editor for Presentations. The editor creates three 'slides' by default with each linked content item from the Web Site Proposal activity represented in a slide. Stream_MainUser can now decompose the text of each content item across a number of slides. The Introduction content item is lengthy and Stream_MainUser decides that this content item will be presented as three slides. This creates three slide items in the Document View editor that are all linked to the Introduction content item. This link ensures that the Document View editor always presents an accurate and current version of the Introduction content item. By default, this item is linked to the original content item in the Stream View editor. Any changes made to the Introduction text are applied to the original item and also reflected in the proposal. However, two sets of additional markup (stored as tags within the content item metadata for the Introduction item) can now be added: slide markup and style markup. Slide markup allows for the user to type an independent summary version of the text or to reformat the line breaks, fonts, colors and other visual style elements of the Introduction text so that it can be displayed across the available slides created for this purpose (in our example, there are three slides available to distribute the text across). These formatting elements are inserted as tags superimposed on the existing content item—the additional tags are not stored in-line to the content item text in the stream data tier; they are inserted into the content item dynamically as part of the compositing and rendering process that generates the visual format of the three slides and the Introduction text as Stream_MainUser has formatted in the Document View editor. The original content item is thus pristine and never corrupted with either tag markup or style markup. Style markup can also be used to present information in bulleted and indented lists using popular visual layouts such as organization charts and information trees.

Stream_MainUser can now generate a document view of the resultant presentation that can be used to present slides to the management team of XYZ. The document view can also be exported into popular formats such as PDF and HTML.

Assembling and Styling the Main Deliverables

Once the team has contributed all the necessary content to the different sections of the proposal, Stream_MainUser can now create another document view—this one for reading/printing as opposed to presenting. This document view will feature the visual formatting and styles (header/footer, cover page, logos, table of contents) that may be required to create a professional proposal from the core content items in the Web Site Proposal activity. The Document View editor enables the view markup for the headers, footers and additional content such as title, authors etc. Style markup layers can apply font styles, color and additional page formatting (page break tags) for printing convenience. The proposal is then exported into PDF or HTML and shared with the Customer Lead for approval.

Publishing Deliverables to Protect the IP Therein

The Stream Cloud presents a unique option to publish the contents of an activity, document view or even just an individual content item. Publishing pushes an immutable copy of the content to the Stream Cloud for permanent storage and also makes a unique hash signature of that content available publicly with the globally unique identifier(s) of the content item(s) involved—this is to ensure that the content signature can be verified by anyone and can be used to prove that the particular combination of characters in the content was published by a verified user, company or government entity. In our example, Stream_MainUser chooses to publish the proposal prior to having it signed off by the Customer Lead to ensure that an independently verifiable copy is available from Citta.

Licensing Content (Including Payment)

When content that features some sort of intellectual property needs to be exchanged, an exemplary embodiment of the present disclosure offers the ability to license that content between users, companies and government entities. A license may convey permanent full-rights or partial rights subject to a Terms of License Agreement documented by the content owner. Content models, document views and content items can all be individually licensed between users, with a fee being charged by a provider of the stream environment according to the present disclosure for transacting and supporting the sale and license. The license can also come with a price tag that can be set by the content owner and payment via standard Internet payment gateways could be required to obtain the license and licensed content. The Stream Cloud can be used as a content marketplace where content can be advertised, bought and sold. Prospective content authors and collaborators can also advertise services and fees and prospective content customers can advertise and auction content authoring jobs and projects, including pro bono and social projects. Stream Cloud projects have two automated capabilities—one is a native integration with popular social & professional networking platforms (for example, Facebook, Google+, LinkedIn) and the other is a native HTML base that allows these projects to be advertised, published, shared on the web with minimal to no knowledge of HTML by users.

Printing and Export Options

When the Web Site Proposal is available to be sent to the Customer Lead, Stream_MainUser decides to add a few additional informational content items in the proposal featuring customer testimonials, track records and previous clients of the team and other case studies as optional information. When the Customer Lead is notified via email of the readiness of the proposal, a link is supplied that renders the proposal in the Stream Cloud in a browser. The rendered document view of the proposal allows the Customer Lead to decide if the optional information should be included while printing or exporting the document view to PDF or sharing it with others within XYZ. The Customer Lead can even choose exactly which pieces of additional information are desirable in the version of the proposal that is to be circulated for review. This allows the deliverable to behave in a dynamic fashion different from traditional documents.

Information Navigation and Creation in Streams

An exemplary embodiment of the present disclosure has an inherent ability to track time and context. Users typically navigate into activities on the basis of time—basic context selection is one click and the user is presented with what items were last updated in a work session in reverse chronological order (latest first). The stream enabled client also defaults to focusing on the last content item that was worked on per activity. Users can setup additional context reminder options such as an overview of the focus guide status (what content items have been created, what marked completed, what items have not been started yet, % complete, etc.). These context reminders are necessary since the stream enabled interface will always return the user to the last state of the activity—which might be a document view, for example—and hence the user may choose to refresh their minds of what activity has occurred most recently in Stream View before continuing to edit the document in the present session. The most important aspect of understanding context, both in resuming a working session as well as in the creation of inter-related content, is a spatial sense of where focus is against the backdrop of the larger content canvas. To provide the user with a powerful spatial tool that aligns with the human way of thinking in three-dimensions, an exemplary embodiment of the present disclosure provides an underlying Content Spatial Zoom technology that is applied across different functions to enable users to navigate and visualize content in a rich manner.

Content Spatial Zoom

Content Spatial Zoom refers to the functional characteristics of the Content Stream Engine which allow the creation of spatial views in applications that allow the user to browse, navigate to & even create content using complex, multi-dimensional and multi-valued relationships between objects in one or more streams including users, time, geography and any and all implicit content relationships. Implicit content relationships are those established by the core constructs when content items are created & edited, primarily credentials, activities, versions and document views.

Spatial zoom is thus a platform capability that allows for the selection of a subset of content (i.e. the level of zoom) from one or more streams along with associated metadata that is then rendered on a content map. The 2-dimensional visual map represents all objects in the scope of the current view and their relationships/associations including parent-child and aggregation relationships. The act of zooming out or zooming in on the map changes the parameters of the selection criteria, resulting in either rendering more objects or rendering more attributes of an already selected ("zoomed-in") object. Zooming out can even render content outside the user's stream—that they may have received or contributed to during collaboration or work projects—as well as other related objects such as geographic locations and other users. The content map can function in many visualization modes, with layers of additional data that can be turned on or off depending on the needs of the user.

Four main layers of the map are: Time, Geography, Content Associations and People. The main visualization modes are Grid mode (where content is rendered in tabular form), Directed Graph mode (which is the native mode of the Stream platform), Tree mode, Earth mode, Timeline mode and Card mode.
1. Time: Examples of time-based views include:
    a. Versions of content items, with the ability to scroll through content changes and compare versions of items to see what changed.
    b. Activity expansion over time, which illustrates the addition and modification of content within an activity over time.
    c. Document View expansion over time, which illustrates the addition and modification of content within a document view over time (including document view markup objects and style layers).
    d. Visual timeline of edit activity across contexts, which illustrates editing/collaboration activity across different activities and contexts over time.
2. Geography
    a. Visual aggregation of content items by the automatically assigned values associated with place of creation & place of last edit rendered in a geographic map.
    b. Named locations associated with geographic data showing content items assigned to those named locations by the user.
3. Content Associations
    a. Implicit associations: includes views that show items in an activity, items in a document view, all activities that share a particular content item and all document views that refer to a specific content item.
    b. Tabular association of content items: a simple row-column relationship of a set of content items that are all children of a single parent content item, which they describe. Standard data in tables would fall in this category but instead of handling numerical values, a system configured according to the present disclosure handles large complex content items (including binaries such as pictures or video) using this mechanism. Typically rendered using Grid mode. Additional aspects of the view include browsing through versions of each row of associated content items.
    c. Model Relationships: Content items are most commonly related through a model. The model may describe the content structure (chapters, sections, related-references) of a single set of content items and this structure is rendered in the spatial view (can be represented in multiple modes). These relationships are typically assigned by the end-user. Model attributes can also be used to describe how to visually render content in different content items at different parts of the model in an intuitive fashion at run-time.

4. People
   a. Collaboration and contribution activity across a single activity, a set of activities or across contexts featuring users and the related content items in scope of the view.
   b. Timescale of interaction and contribution by user(s) across a single activity or a set of activities or across contexts.
   c. Ownership and references to content items owned by users.

Note: In all places above where users are referenced, companies or government entities may be involved as legal owners of the stream(s) involved.

Advantages of Stream Networks

Stream enabled networks have the following advantages:
1. Intellectual Property rights on content. Offered via the strong credential service enabled by a system configured according to the present disclosure combined with the Stream Cloud to ensure that a legally valid copy of content is available to prove ownership and time of publication on the Web.
2. Ability to store & manage existing content on a personal computer using streams enabled clients and interfaces locally, at a granular level (not documents or files excluding binary files used for pictures, audio and video) featuring globally uniquely-identified pieces of content known as content items.
3. Ability to compose commercial, high-value content including traditional documents (for reading or presentation) by assembling these from content items as defined earlier.
4. Ability to collaborate, exchange, version, aggregate, publish, reformat, re-arrange visually, sell content items as part of the content management and authoring workflow of a productivity solution. Note: content items are not equivalent to files or Documents in previous productivity suites and pages within documents in previous productivity suites.
5. Ability to re-use and visually reformat the flow of the same content items to create different documents or different versions of the same document, including the creation of side-by-side simultaneous alternative versions of a document (e.g., a document for reading/printing and a presentation, as described above) or even content items within a document.
6. Ability to convert home personal computers and personal storage devices into private and public web applications to allow time-limited free sharing of the most recent content hosted and distributed for a few days via the Stream Cloud, more extensive long-term sharing (and storage quotas) via a paid account with the Stream Cloud, both offerings being accessible as unique web sites on browsers across devices and platforms and indexed by popular search engines. This effectively allows users to use their personal resources at home in the creation of a web-sharing paradigm for publishing pictures, documents, blogs and a personal web site featuring resume/bio information and advertising skills and services for commercial content creation engagements that can be initiated, managed, tracked and paid for via the Stream Cloud.

Example: Use Case of Content Items within a Stream

Implementations of the present disclosure can be used by one or more users to create, manage, visually style, present, revise, review, print, collaborate, share, protect and sell content.

In an example implementation, a user, John Stream-User, uses an implementation of the above described application and platform while starting a new work engagement with a customer, the XYZ Company. In this example, John mainly deals with a single key person at XYZ, called Ted Customer. John also works with a team of people within his organization, as well as occasionally recruiting the services of external consultants. Several example users are summarized in Table 3 below.

TABLE 3

| Name of User | Role | Comments |
| --- | --- | --- |
| John Stream-User | A user of an example implementation of the application and platform. | |
| Ned Tech-User | A technology consultant that John occasionally uses when working on a project. | Ned does not work for the same company as John. He is an independent consultant that also uses an implementation of the application. |
| Bill Finance-Guy | Occasionally works with John to help with financial aspects of projects (e.g., cost projections or how much to bill the customer). | Bill works for the same company as John. |
| Ted Customer | The main contact at the XYZ Company. | |

While several example users are described above, these examples are provided to describe an exemplary implementation of the system. Depending on each implementation, there may be a different number of users and different types of users (e.g., users having different roles and relationships) than those described above.

In this exemplary implementation, all of John's activities (e.g., his notes, emails, chats, documents, files, pictures, and other media) are stored in John's stream application. This stream application allows John to switch between different activities by keeping this information segregated using containers (i.e., "profiles"). As an example, John may have a collection of work-related activities and personal activities. The stream application can store information pertaining to John's work-related activities in one profile, and store information pertaining to John's personal activities in another profile. John can switch between each of these profiles in order to find information relevant to the selected activity.

When a user starts the streams client application, the stream application may automatically select one of these profiles. For instance, the stream enabled client application may automatically select the last profile that a user worked on. In this example, John last worked on his work-related profile, and the streams enabled client application automatically selects and displays his work-related profile upon start. In some implementations, the streams enabled client application can automatically open one or more profiles according to other criteria (e.g., based on a pre-determined "default" preference, the amount of time a user has spent on each profile, the location of the user, the time of day, or other criteria). In some implementations, the streams client application might not open a profile until it receives a manual selection from the user.

Figure 5:
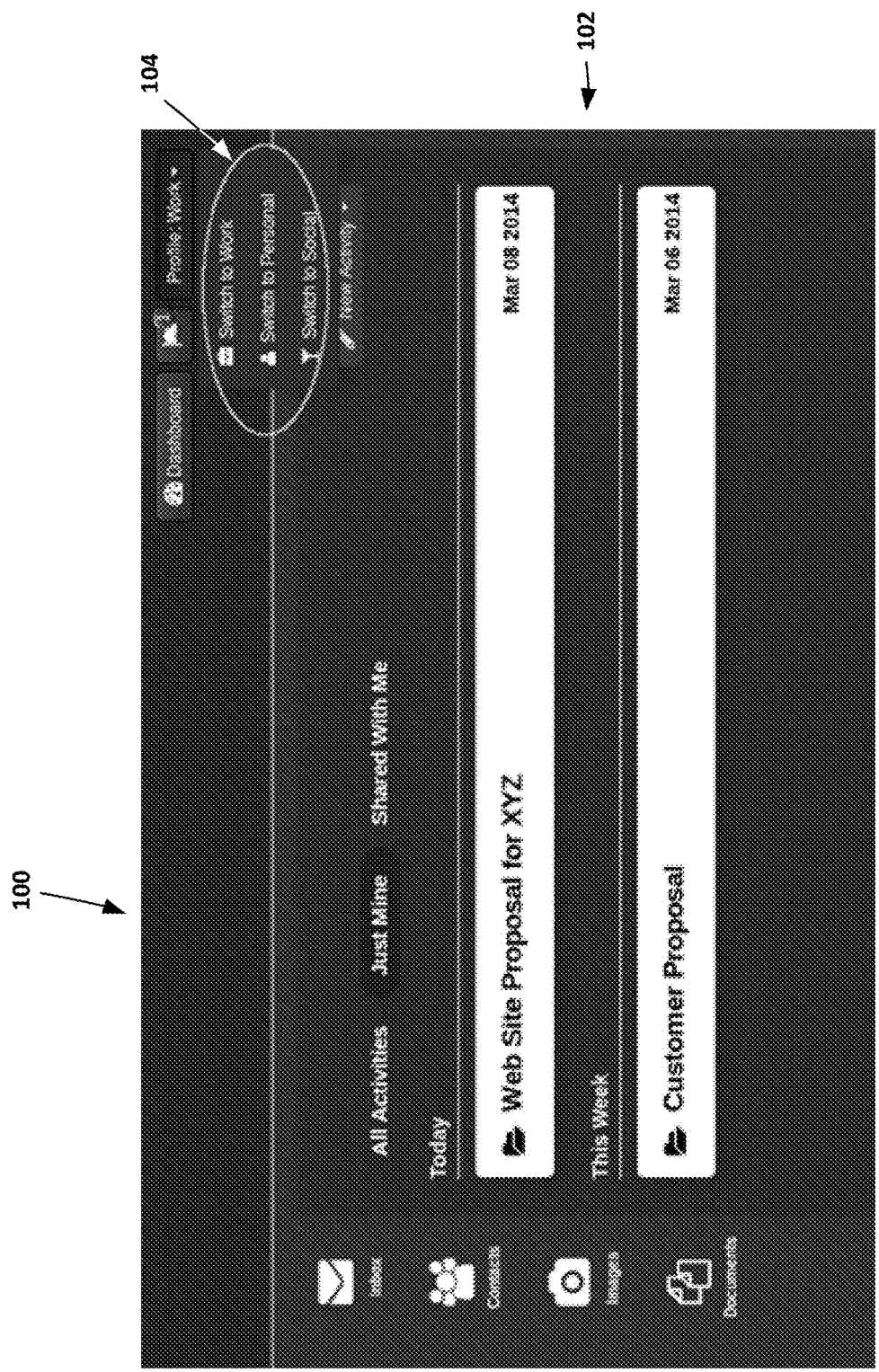
FIG. 5 illustrates a user interface according to an exemplary implementation of the present disclosure.

When a profile is selected, the streams application reduces the number of information items that a user has to view at any given time (i.e., the application "filters" the information). An exemplary user interface of the application is shown in FIG. 5. Here, the user interface displays a dashboard 100, which provides the user with a visual summary of what he was working on last. For example, the dashboard 100 includes an activities display area 102, which displays a visual sequence of activities, documents, content topics and notes by the date they were last modified, putting the most active items on top. In some implementations, the dashboard 100 can sort information according to other criteria (e.g., according to an alphabetical order, data size, or other criteria).

Dashboard 100 also includes a profile selection area 104, which allows the user to manually select a profile. In this example, a work-related profile is selected (as indicated by area 104), and work-related activities are displayed in area 102. A user may select a different profile in area 104, and in response, area 102 is updated to display activities related to the selected profile.

Each profile can contain sub-profiles. For example, John might be associated with more than one company (e.g., a company C-1 and another company C-2). John can choose to create additional sub-profiles for C-1 and C-2 within his work-related profile to further partition the view and keep the activities, documents, notes, contacts and messages related to each company separate.

A user can also use the streams enabled client application to maintain an archive of information from previous activities in different profiles. For instance, a user might store content from his previous jobs in one of more of his profiles. The user can then search and browse through the archived content (e.g., documents, messages, etc.) and if desired, can re-use content from the archives.

A user can switch between profiles in order to store information within a specific profile. For example, John may remember something he wanted to write down for a personal project he was working on, and can use profile selection area 104 to switch to his personal profile (i.e., switch out of his work-related profile). He can then record information in the profile (e.g., by using a "quick note" option to type in a note, which is then stored in his personal profile. After recording this information, John can use profile selection area 104 to switch back to his work-related profile to continue with work-related tasks.

The dashboard 100 also indicates if any new activity has occurred (e.g., if new comments or new versions of documents have been received). A user can select an activity in order to learn more about the new activity. For example, if the user is interacting with the application using a mouse, when the user "mouses-over" an activity with his cursor, the application might display a window that displays additional information about the selected activity (e.g., a pop-up window that displays an extract of the content inside that activity, document, or note).

In another example, if the user is interacting with the application using a touch screen, when the user taps on a "preview" icon, the application might display a window that displays additional information about the selected activity.

A user can interact with the streams enabled client application in order to create documents based on information stored in their profile(s). In an example, John Stream-User can use the streams enabled client application in order to produce a web site work proposal that outlines how John and his team plan to build and deliver a new website for the customer, the XYZ Company.

John might begin by searching through his profiles to see if there are re-usable documents or other pieces of content that might make it easier to draft a proposal for the XYZ Company. The search returns documents as well as content models that match the search terms. Content models are templating elements that are capable of producing not just documents, but even dynamic content applications, complete with an ability to allow the reader to interact with what they are reading.

After initiating a search, John finds an available "web site proposal" content model that appears to be a technical proposal of work for building a web site. As it appears suitable for his needs, he selects that model for use in the activity for the XYZ Company. As John has not yet created a document, upon selecting the model, John is prompted by the streams enabled client application to create a document within the selected activity (i.e., the activity for the XYZ Company). He types in a title for the new document, calling it the "Proposal Draft" document.

When John creates the Proposal Draft document using the "web site proposal" content model, the streams enabled client application automatically populates the document's structure with a set of sample sections and topics based on the selected content model. In this example, the sample sections and topics include:

1. Suggested section and topic headings
2. Sample text and diagrams
3. Instructions for further customizing each topic.
4. A suggested writing team for the document (e.g., a listing of different team member roles required to complete the document.

A content model can include other samples sections and topics, depending on the implementation.

Figure 6:
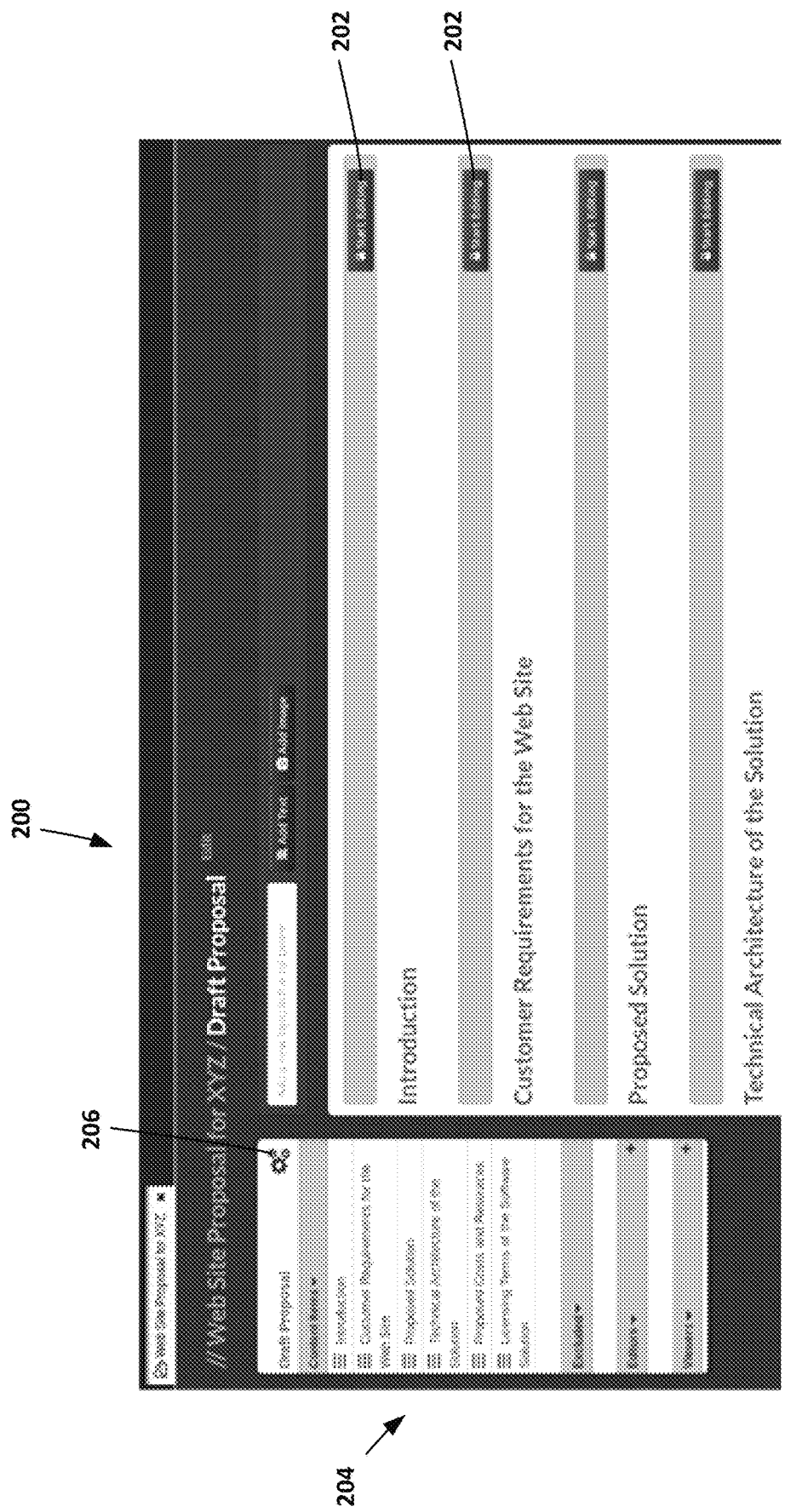
FIG. 6 illustrates a user interface incorporating a focus guide according to an exemplary implementation of the present disclosure.

The draft document structure is displayed to the user in the streams client application using a visual tool called the focus guide. An exemplary embodiment of a user interface incorporating the focus guide 200 is depicted in FIG. 6. The focus guide 200 plays a dual role: it acts as a storyboard (i.e., a way to plan the narrative sequence of the document) as well as a tool to keep track of what sections have been finished, what parts of the document are in progress and other task-oriented indicators derived from the content model of the document. Accordingly, in this example, the focus guide 200 can help John to identify what writing tasks need to be performed next, and what he (or the rest of the writing team) needs to focus on to get the document finished. The focus guide 200 also can help John to focus on the overall structure of the document, which may be helpful when dealing with a relatively lengthy or unwieldy document. The focus guide 200 can also allow the user to edit the document. For example, using the focus guide 200, John can edit the content headings and content data (e.g., by selecting an edit button 202 and entering new information), and re-sequence the topics of the document (e.g., by dragging and re-ordering content headings in area 204)

In some implementations, some content models can be configured such that they require specific pre-defined headings and structure. For example, in some implementations, a content model may have pre-defined headings that conform to industry technical standards, regulatory requirements, or other standards that might be relevant for a particular type of activity. In these cases, the headings or structure of a content model might not be editable by the user.

A user can also interact with the focus guide 200 to set up a team to collaboratively work on the present document. In this example, the model that John selected for the web site proposal activity also includes a "setup team" option via the settings button 206 of the focus guide 200. The content model includes a suggested list of roles of team members that may be needed to write the proposal. John can select collaborators that can fulfill each suggested role (e.g., from a stored list of contacts). A user can select as many or as few other collaborators as required for the proposal.

The example implementation described above is intended to illustrate one example usage of the stream application and platform. The functionality of the application and platform are not specific to any particular usage or industry, and can be implemented across all types of content creation activities in different industries, and can feature different professional disciplines. Similarly, the organizations and people described in this example are not intended to be limiting example. For example, implementations of the application and platform can be used to provide large enterprises, sole proprietorships, independent consultants, pro bono teams from social networks, and individuals with similar content creation and collaboration functionality.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

In another embodiment, a collaborative document content editing system allows multiple distributed users, via a source master document and associated branch documents, to coauthor independent related draft versions of the master document in an asynchronous fashion with section and subsection editing granularity. The system provides mechanisms to merge and quiesce changesets for multiple submitted draft changes, from multiple authors, to a master document with automated section and subsection placement.

In one example, all content items may be parented to (i.e., metadata associated with the content item may identify the content item's parent as) a stream, which itself may be represented as an object. Streams may be associated with an owner entity such as a person or company. Content items may be identified through metadata as, inter alias, a "master content item" or as a "version" of a master content item. Metadata associated with content item versions may include an identification of a parent master content item for that version. Content item versions may be static, immutable representations of a point-in-time snapshot of the entire master content item and its associated internal state. Content items, both master content items and content item versions, may be identified by globally unique content item identifiers that are recorded in metadata associated with the content items. Accordingly, any mix of master content items and content item versions may exist side by side without conflict and may be freely exchanged across streams, users or other boundary without conflict. In addition, the globally unique identifiers may be utilized to enable the state of the various content items to be updated across user databases, as is especially useful when users come online from a period of being offline, without a network connection.

Documents may be parented to any one or more different parent objects or containers such as, for example, an activity, project, or, in a free-floating example, a stream. For example, a project object may be created as a container under, and parented to, an activity object. Project objects may be configured with a set of one or more collaborators in addition to an owner of the project. In addition to containing documents, projects may also be configured to contain content item objects, content model objects, task objects, and note objects. Note objects may be configured as standalone content item objects that are not necessarily parented to a particular document, but which may be parented to the project. All or some of the contents of projects may be replicated across the owner and participating collaborators to ensure that all members of the project team have the ability to work offline (not connected via network to one or more other collaborators, the owner, or a central server). In addition, a real-time replication process may work in the background to ensure that when users are working online, they have access to the most up-to-date copies of the project contents.

Like content items, documents may take the form of, inter alias, master documents and document versions. Document versions may be objects that are parented to a corresponding master document object. Document versions may be configured as immutable and content models within document versions may be configured to point to particular content item versions that are also immutable, resulting in all objects associated with a particular document version being immutable. Versions of content items or documents may be declared upon the occurrence of an event, such as the submission of a draft, creation of a branch, upon a manual instruction to do so, after a predetermined number of edits have been made, and/or periodically after a predetermined time interval has elapsed. It will be appreciated that the present discussion of versioning and collaboration is equally applicable to master objects such as collections of photographs, slide shows, spreadsheets, etc.

Figure 7:
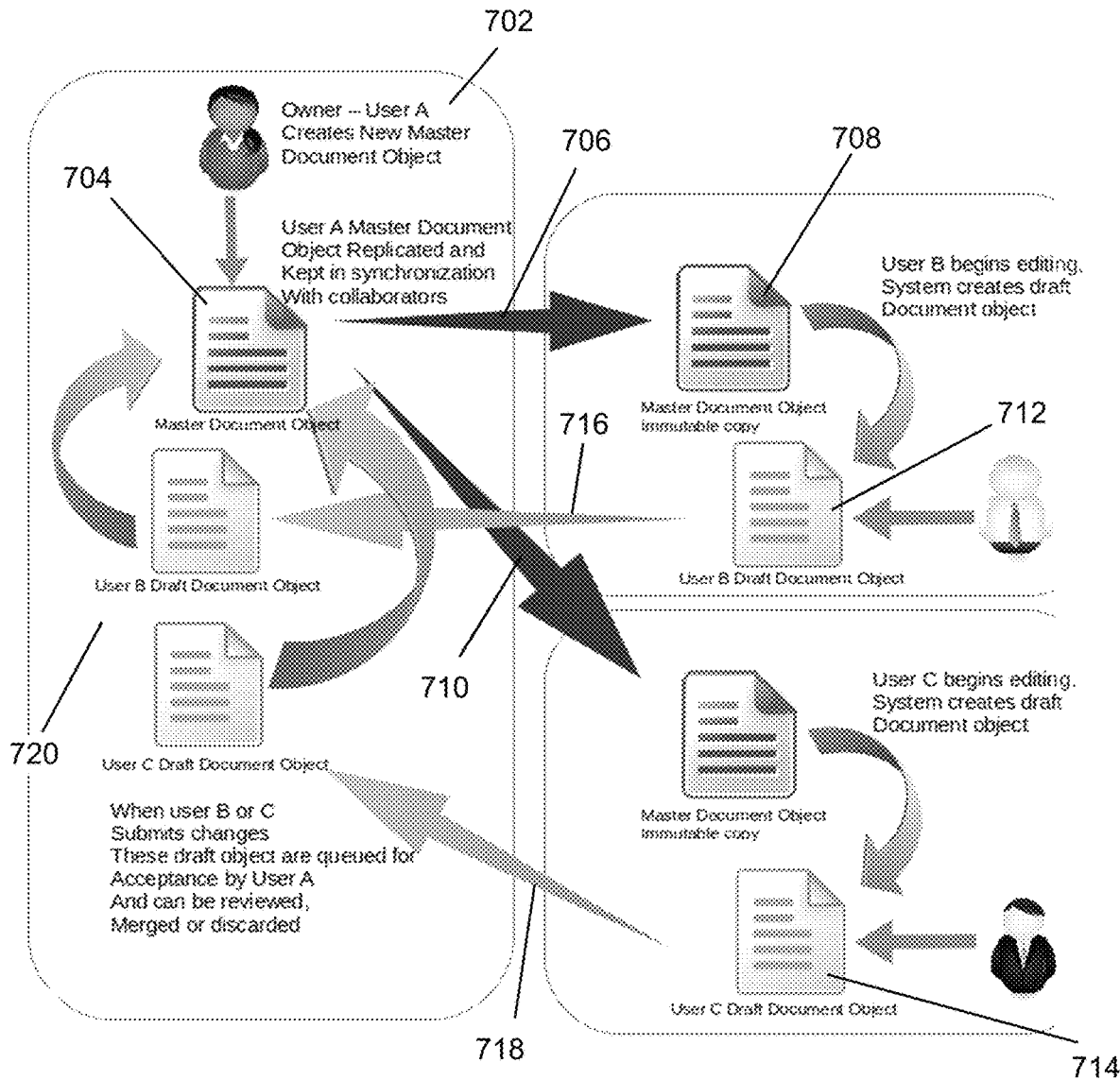
FIG. 7 illustrates a workflow in which users collaborate on a document through an exemplary implementation of the present disclosure.

FIG. 7 illustrates a workflow in which users collaborate on a document through an exemplary implementation of the present disclosure. For example, the owner of a document ("User A"), such as an individual user or a user acting on behalf of a corporate entity, may create 702 a new master document object 704. The master document may contain a content model and may be associated with one or more content items containing content for the master document. Subsequently, User A may decide to share the master document with User B to solicit User B's review and proposed edits to the document. Alternatively, User B, by virtue of being associated with a project containing the master document object 704, may be permitted to request a shared copy of the master document object 704 to work on without User A's involvement. To share the document, the master document is replicated 706 to form an immutable copy of the master document as it exists at that instance in time 708. Through this process, a "branch" of the master document is formed. In the same manner, User A may share the master document with User C 710 and any number of additional users at the same or at a different point in time. Accordingly, Users B and C are able to review and edit their respective snapshots of the master document object in parallel, but without the need for each user to maintain a constant network connection to keep their edits in sync. User B's edits are captured in a draft document object 712 and User C's edits are captured in another draft document object 714. Upon completion of their review, or at any intermediate point, User B may elect to submit 716 their edits back to the owner of the master document, User A. Likewise, User C may elect to submit 718 their edits back to User A at another point in time. When User B or User C submits their proposed edits to User A, the draft document objects (712 or 714, respectively) are queued 720 for review by User A.

Focusing now on the aspect of object (document, content item, etc.) branching, an object branch (a point-in-time replication of a master object) may be parented to the master object from which it originated. The creation of an object branch may be triggered by an action of a collaborator (for example, a collaborator associated with a project containing the master object) seeking to provide their edits to the master object or may be as a result of the owner of the master object delegating editing responsibilities to a collaborator. An object branch may be configured to include snapshot metadata information about the master object from which it originated at the time of its creation. After the instant that the branch is created, the master object may continue to be mutable by its owner. Thus, a branch of an object begins as a snapshot of the master object. An object branch may include a static copy of the master object's content model in addition to relationship data at the time of the branching regarding any master objects contained in the master object being branched (e.g., master content items in a master document). An object branch may itself be versioned or replicated like other objects, as discussed herein. For example, in the workflow depicted in FIG. 7, when User B submits 716 their draft document object 712 back to User A, a version of User B's branch may be recorded as an immutable version snapshot of the branch at the time of submission 716. In another example, User B may replicate their branch and invite User C to collaborate (a branch of a branch), instead of the owner creating a branch of the master object and inviting User C's collaboration as shown in FIG. 7. In this instance, any edits made by User C may be submitted to User A or User B, as either the owner (User A) or User B prefers.

In one example, a branch may be updated (either automatically or manually) if the master object corresponding to the branch changes. In one exemplary implementation, changes made to the master object may be presented to a collaborating user working on a branch of the master object as marked revisions. If the collaborator disagrees with any of the marked revisions, the user may be provided with the option to suggest to the master object's owner (through a draft object submission or otherwise) that the revision be undone or that the revision be accomplished in a different way. For example, if a master content item included the phrase "The sky is blue" at the time that a branch was created and the master content item's owner later revised it to read "The sky is purple," a collaborator working on the branch in parallel may see this revision in her view of the branch appear after synchronization with the master document object as a marked revision and choose to change the sentence back to the original "The sky is blue." The master content item owner would see the collaborator's reversion as a proposed edit in their review queue and have the option to reconsider their change to "purple."

The submission of draft branch objects back to the owner of the corresponding master object can be configured, for example, as the setting of a status flag on the draft branch object from "new" (as was set at creation of the branch) to "submitted." Of course, subsequent re-submissions of draft branch objects corresponding to the first-submitted draft branch object may be tracked by version metadata in addition to the status flag, which may also include or refer to the identification of the version last submitted to the master object owner. In one example, the owner of the master object may elect to delegate responsibility for reviewing submissions to another collaborator working on the project. In this instance, the delegated collaborator may be provided with replicated copies of the master object and all branches to facilitate review. In another example, all collaborators working on a project may be configured to receive local copies of project objects and branches. In such an example, offline collaboration may be enabled, as a network connection would not be needed to view or edit local copies of the objects. Upon re-establishment of a user's network connection, the system may be configured to synchronize the user's local copies of project objects and branches. If any changes occur as a result of the synchronization process detecting a change made by another collaborator to a project object or branch, they may be marked for the user to review, as discussed above. In the example that all collaborators maintain local copies of project objects and branches, resiliency may also be added to the system, as the distributed copies of objects and branches may be used to reconstruct a local set of project items for a user in the event that that user's computer becomes lost or needs to be replaced.

When a draft branch object is submitted to the owner of the corresponding master object for review, a changeset may be computed by the system by comparing (1) the latest corresponding master object to (2) the submitted draft object and (3) the snapshot of the master object at the time that the corresponding branch was created. The changeset may be configured to identify any differences between the three compared items, for example any changes, additions, removals, edits or rearrangements made to the title of the object, a content model associated with the object, or any objects within the master or draft object (e.g., content items within a master or draft document object). The changeset, or a portion of the changeset may be presented to the owner or her designee for review. In one example, some changes noted in the changeset may be automatically accepted or denied without the owner's involvement. For example, if an owner makes a change to a master object subsequent to the creation of a branch and the collaborator working on the branch makes a competing change to the portion of the object that the owner changed, the owner's change may be configured to automatically trump the collaborator's change.

In displaying the changeset to the owner or her designee, each proposed change may be displayed in a list, with a context-specific identifier for the change. For example, a change proposed to a content item titled "Introduction" may be displayed as a clickable link titled "Introduction" which, when clicked, would bring up the display of the change marked within the "Introduction" content item. Proposed changes may also be presented to the owner or her designee together with an indication of the collaborator providing the edits. Such indication may be textual (e.g., "User B proposal") and/or may be graphical (e.g., all of User B's edits are shaded green, User C's edits are shaded blue, etc.). Proposed changes from different users or received at different times may be ordered in the list by time of submission, portion of the master document proposed to be changed, by user identity, etc.

Together with, or instead of, a list of proposed edits, a merged view of a master object may be generated which includes the most recent version of the master object merged together with all or some of the proposed changes thereto. For example, in the context of a master document object, the system may be configured to identify content items that are proposed to be removed from the document by verifying (a) content items present in the corresponding branch's snapshot of the master document's content model at the time of branch creation and which (b) are still present in the current master document's content model, but which (c) are not present in the submitted draft document's content model. As another example, still in the document context, changed content items may be identified by comparing the contents of the content items associated with the draft document with corresponding content items in the current version of the master document. In still another example, new content items in a draft document submission may be identified by comparing the content model of the current master document to the content model of the submitted draft document. For any new content items identified, a best guess as to the placement of the new content items may be calculated by identifying the nearest content items before and after the new content item and locating the insertion point between the corresponding content items in the master document. For example, if the order of the content items in the master document object is A-B-C, and a new content item "D" in a submitted draft document object is identified as being between content items B and C in the draft document submission, the merged master document displayed for the owner of the master document may display proposed new content item D in a corresponding position (e.g., A-B-D-C). When any proposed changes are accepted by the owner, these changes may be applied to the master document object and may be promulgated to other users working on the project with a local copy of the master document object.

In the event that proposed edits from multiple collaborators compete with one another, such competing changes may be presented to the reviewer side by side, or a ranking may be applied to the competing edits to order the comparing edits and the reviewer may be presented with one edit, or at least one edit at a time. For example, if User B proposes changing "The sky is blue" to "The sky is red" and User C proposes changing it to "The sky is green," a reviewer may be presented the option to keep "blue" or accept a change to either "red" or "green." In another example, User B might have more authority according to a corporate organizational chart than User C does and therefore User B's edit alone may be presented to the reviewer. In another example, based on their superior authority level, User B's proposed edit may be presented to the reviewer to accept or reject first, then User C's proposed edit may subsequently be presented to the reviewer for their acceptance or rejection. Other ranking metrics may employed in addition to or instead of authority level, for example, the time that the proposed change was made, the time that the submission containing the proposed change was made, the overall number of proposed changes in the submission containing the proposed change, etc.

Figure 8:
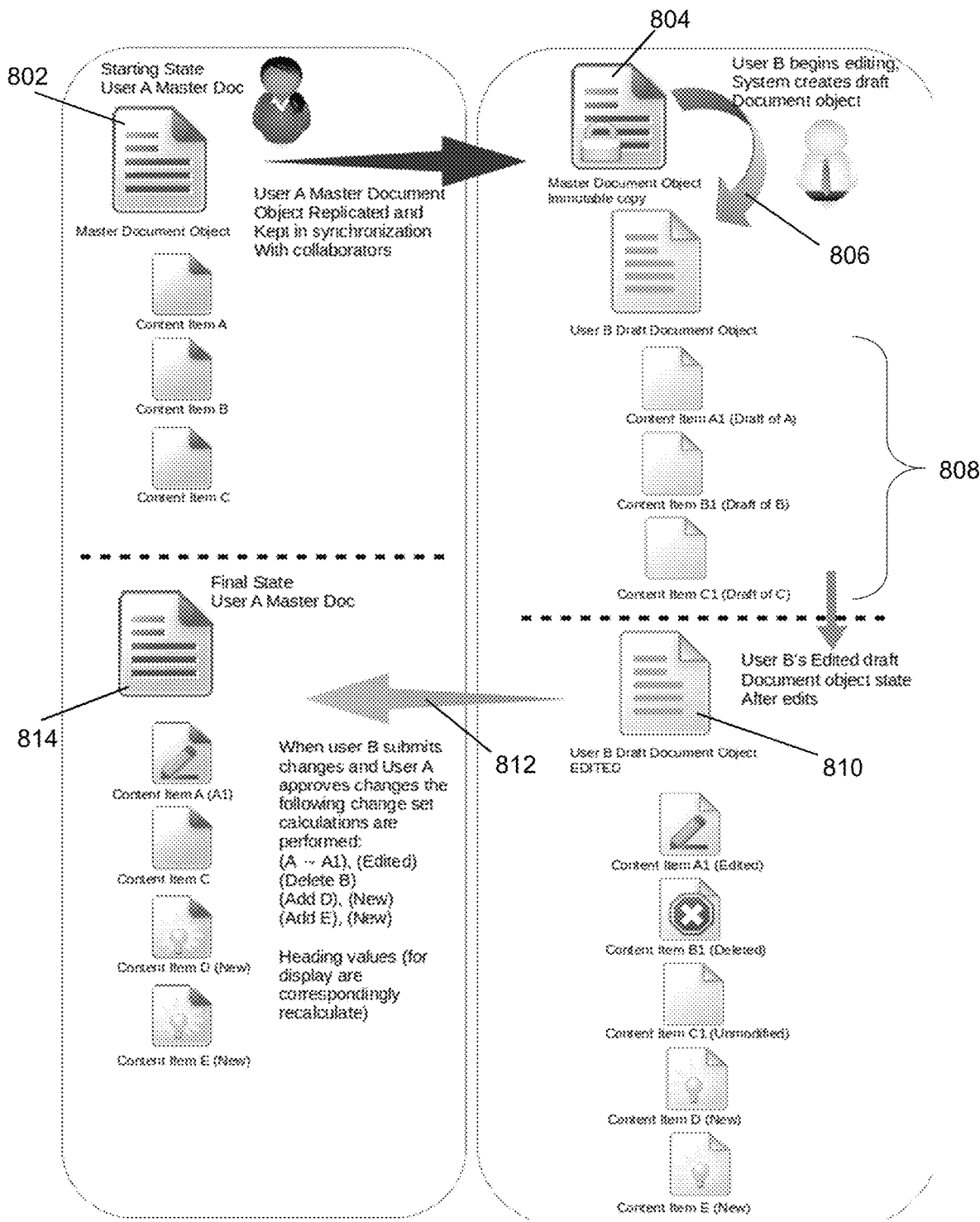
FIG. 8 illustrates a workflow in which users collaborate on a document through another exemplary implementation of the present disclosure.

FIG. 8 illustrates a workflow in which users collaborate on a document through another exemplary implementation of the present disclosure. In FIG. 8, User A is the owner of master document 802, which contains Content Items A, B and C. User A invites User B to collaborate on the document (or User B initiates the collaboration) and an immutable copy (branch) of the master document 804 is created. It should be noted that any portion of a master object may be designated as locked or read-only such that when a branch is created, the content of the locked portion is available for viewing in context by the collaborator working on the branch, but edits to the locked portion are not permitted. For example, in a document context, particular "reference" content items may be viewable, but locked from collaborator editing. As soon as or before User B begins to make edits to the branched copy, a draft document object is created 806 that references the branched copy of the master document. Corresponding draft Content Items A1, B1 and C1 are also created 808 for User B. In the example shown, the result of User B's edits to the draft document 810 is that the content of Content Item A1 is edited, Content Item B1 is deleted, Content Item C1 is unmodified, and new Content Items D and E are created immediately following Content Item C1. When User B submits 812 the draft document to User A for review, the draft document 810 is compared against the current version of the master document 802 and the original copy of the master document made 804 at the time the corresponding branch was created in order to identify and present the proposed changes to User A for review. As shown in FIG. 8, if User A chooses to approve the proposed changes, Content Item A1 takes the place of Content Item A, Content Item B is deleted, and new Content Items D and E are added to the end of the document after Content Item C, which remains unchanged. Thus, the new version of the master document includes Content Item A1, C, D, and E in that order. Heading values in the document may be recalculated upon acceptance of the changes.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As one example, a function configured to create an editable branch child object is provided below:

```
/**
 * Function creates an editable branch child object (different from a version, since a
   version should be immutable)
 * The object will have the object it is a branch of as parent in the system attrs.
 * @param objectType
 * @param objectId
 * @param contentDb
 * @param user
 * @param callback
 */
NosSolariaModel.prototype.createEditableBranchForObjectById = function(objectType,
    objectId, contentDb, user, callback) {
    var errMsg = {apiError: {errorCode: 202, errorMsg: "API Error in
createEditableBranchForObjectById."}},
        self = this,
        targetCollection,
        branchedItemId = null,
        branchedContentItemParentIndex = { },
        operationKey = 'createEditableBranchForObjectById';
    targetCollection = contentDb.models[objectType];
    // Method to create a branched sub-item and save to the database (for content
    items and incl doc/CI tuples)
    var _createBranchedSubItem = function(solContentItem, done) {
        // TODO Refactor: The lines below could become the basis of a
        createCopyOfObject method that accepts the object itself
        var clonedSubItem = self.cloneSolariaObject(solContentItem, true, false,
user.id);
        // Create an unlocked branch version of the content item
        clonedSubItem.s.pId = solContentItem._id;
        clonedSubItem.s.pType = solContentItem.CN;
        clonedSubItem.s.isLocked = false;
        // Reset any flags on the new item
        clonedSubItem.u.flags = 0;
        contentDb.models.contentitem.create(clonedSubItem, function(err,
newContentItem) {
            if(err) {
                done(err.message);
            } else if(newContentItem) {
                // Store the item _id so we can replace it in the nested model
                branchedContentItemParentIndex[solContentItem._id.toString( )] =
newContentItem._id.toString( );
                // Create a tuple to associate
                // TODO Design: This could be done in bulk via addLinkedObjectById but
                it may be better to reliably create it per item
                self.addLinkedObjectById(branchedItemId, 'document',
[ ].concat(newContentItem._id.toString( )), 'contentItems', 0, contentDb, user,
                    function(err, tDoc) {
                        if(err) {
                            done(err.message);
                        } else if(tDoc) {
                            done( );
                        }
                    }
                );
            }
        });
    };
    var _recurseUpdateNestedModel = function(argToUpdate) {
        for (var k = 0, maxK = argToUpdate.length; k < maxK; k++) {
            argToUpdate[k].id = branchedContentItemParentIndex[argToUpdate[k].id];
            if (argToUpdate[k].nodes && argToUpdate[k].nodes.length > 0)
                _recurseUpdateNestedModel(argToUpdate[k].nodes);
        }
    };
    var _copyContentItemsInDocument = function(done) {
        self.getLinkedCollectionByName(objectId, objectType, 'contentItems',
        contentDb, user, function (err, dataColl) {
            if(err) {
                return done(err.message);
            }
            // We need to check items and tuples as both need to be replicated in the
            new document
```

-continued

```
            if(dataColl.items && dataColl.items.length > 0) {
                async.forEach(dataColl.items, _createBranchedSubItem, function(err) {
                    if(err) {
                        done(err);
                    } else {
                        done( );
                    }
                });
            } else {
                // Either there are no CIs in this document or there is something
wrong with the linked CI collection
                // > In either case, this method will report as done - which will
result in an emtpy branch doc, for now
                done( );
            }
        });
    };
    // Determine if this method can create a branch for the supplied object type
    if(objectType === 'document') {
        self.createCopyOfObjectById(objectType, objectId, true, false, contentDb,
user, function(errorStr, copiedObject) {
            if (errorStr) {
                errMsg.apiError.errorMsg += 'Error creating a copy for object of type
' + objectType + ' with id: ' + objectId + '; Error: ' + errorStr;
                callback(errMsg, null);
            } else if(copiedObject) {
                // An editable branch of a versionable object is a child object that
is not locked for editing
                copiedObject.s.pType = objectType;
                copiedObject.s.pId = objectId;
                copiedObject.s.isLocked = false;
                // Reset any user flags too
                copiedObject.u.flags = 0;
                copiedObject.u.editableBranchId = undefined;
                // Setup the model section of the data to handle branch and changeset
management
                // TODO Refactor: This could either be something to generalize in
solaria-objects or not, depending on other use cases
                // > If not, it might still belong in explicitly declared attrs in the
data section
                copiedObject.data.model.branchStatus = 'New';
                copiedObject.data.model.branchMasterModelSnapshot =
JSON.parse(JSON.stringify(copiedObject.data.model.nestedModel2));
                copiedObject.markModified('data.model');
                /* Other Attrs to be available - no initial values
                copiedObject.data.model.branchSubmittedOn = '';
                copiedObject.data.model.branchChangesetLog = { };*/
                copiedObject.save(function(err) {
                    if(err) {
                        errMsg.apiError.errorMsg += err.message;
                        return callback(errMsg, null);
                    }
                    branchedItemId = copiedObject._id.toString( );
                    _copyContentItemsInDocument(function(err) {
                        if(err) {
                            errMsg.apiError.errorMsg += err;
                            return callback(errMsg, null);
                        }
                        // Content Items have been processed, so update the
nestedModel in the new doc
                        _recurseUpdateNestedModel(copiedObject.data.model.nestedModel2);
                        // TODO Review: Mongoose requirement for untyped/open-schema
fields - got to set the dirty flag
                        // > otherwise the Save operation doesn't detect the deep
change
                        copiedObject.markModitied('data.model.nestedModel2');
                        copiedObject.save(function(err) {
                            if(err) {
                                errMsg.apiError.errorMsg += err;
                                return callback(errMsg, null);
                            }
                            // Update the master Object to reflect that an editable
branch is available...
                            targetCollection.update({_id: objectId},
{'u.editableBranchId': copiedObject._id),
                                function(err, retDoc) {
                                    if(err) {
                                        errMsg = 'There was a problem updating the
editable branch ID an object that was forked. ' + err.message;
```

-continued

```
                                            return callback(errMsg, null);
                                        }
                                        if(retDoc) {
                                            callback(null, copiedObject);
                                        }
                                    }
                                );
                            });
                        });
                    });
                }
            });
        } else {
            errMsg.apiError.errorMsg += 'Un-supported object in call to create an editable
        branch. Only documents are supported at this time.';
            callback(errMsg, null);
        }
};
```

In another example, a function configured to retrieve a list of submitted branch objects for review is provided below:

```
/**
 * Retrieves a list of submitted branch objects, given the object type and unique ID
   of the target Master object
 * @param objectType
 * @param objectId
 * @param contentDb
 * @param user
 * @param callback
 */
NosSolariaModel.prototype.getChangeListForObjectById = function(objectType, objectId,
    contentDb, user, callback) {
    var errMsg = {apiError: {errorCode: 202, errorMsg: 'API Error in
    getChangeListForObjectById. '}},
            self = this,
            targetCollection,
            targetQuery,
            masterDoc,
            operationKey = 'getChangeListForObjectById';
        targetCollection = contentDb.models[objectType];
        targetQuery = targetCollection.findOne({_id: objectId});
        targetQuery.select({CN:1, SVER:1, streamId:1, s: 1, o: 1, u: 1, data: 1});
        var changeList = self.createCollectionObject('collabChangeList');
        changeList.streamId = user.id;
        changeList.pId = user.id;
        changeList._id = 'collab-version-docs';
        changeList.itemCN = 'collabChangeSet';
        // Call the internal method to compare a specific Branch object with the master
        and determine changes as well as a suggested merged Master object
        var _computeChangeSet = function(brObject, done) {
            self.computeChangesetFromObjectBranch(masterDoc, brObject, contentDb,
    function(err, theBrChangeset) {
                if(err) {
                    return done(err);
                }
                changeList.items.push(theBrChangeset);
                done ( );
            });
        };
        // Find the target Master object first
        targetQuery.lean( ).exec(function (err, objectDoc) {
            if (err) {
                errMsg.apiError.errorMsg = 'Error getting a change list for object of type
    ' + objectType + ' with id: ' + objectId + '; Error: ' + err.message;
                callback(errMsg, null);
            } else if(objectDoc) {
                masterDoc = objectDoc;
                // To retrieve the Change list, identify any versioned children of this
    object that have not been processed
                targetcollection.find({'s.pType': objectType, 's.pId': objectId,
    's.isLocked': false, 'data.model.branchStatus': 'Submitted'},
                    function(err, changeSubmissionDocs) {
                        if(err) {
                            errMsg.apiError.errorMsg += 'Failed to retrieve submitted
    branches for an object: ' + err.message;
```

```
                    return callback(errMsg, null);
                }
                // Process change set generation for every branch object
identified and then return the entire change list to the caller
                if(changeSubmissionDocs && changeSubmissionDocs.length > 0) {
                    async.forEach(changeSubmissionDocs, __computeChangeSet,
function(err) {
                        if(err) {
                            errMsg.apiError.errorMsg += 'Failed to compute change
set for an object: ' + err;
                            return callback(errMsg, null);
                        } else {
                            callback(null, changeList);
                        }
                    });
                }
            }
        );
        } else {
            errMsg.apiError.errorMsg = 'Error getting an object: Not Found.';
            callback(errMsg, null);
        }
    });
};
```

In still another example, a function configured to compute differences between master objects submitted branch object drafts and to generate a proposed merged master object is provided below:

```
/**
 * Given a master object, and a branch object, this method computes the differences and
generates a proposed Merged master
 * object for review by the Owner of the master object
 *
 * @param masterObject
 * @param branchObject
 * @param contentDb
 * @param callback
 */
NosSolariaModel.prototype.computeChangesetFromObjectBranch = function(masterObject,
branchObject, contentDb, callback) {
    var errMsg = "APIError incomputeChangesetFromObjectBranch.",
        operationKey = 'computeChangesetFromObjectBranch',
        crypto = require('crypto'),
        sha1hash1 = crypto.createHash('sha1'),
        sha1hash2 =crypto.createHash('sha1'),
        comparisonData = {
          sourceCardIds: [ ],
          sourceCards: [ ],
          sourceCardIndex: { },
          flatMasterModel: [ ],
          flatMasterModelIndex: { },
          flatBranchModel: [ ],
          flatBranchModelIndex: { },
          flatBranchMasterModel: [ ],
          flatBranchMasterModelIndex: { },
          branchSnapshotDate: null
        },
        resultChangeSet = {
          "streamId": branchObject.streamId,
          "displayName": " ",
          "avatarImagePath": " ",
          "contentType": branchObject.o.contentType,
          "submittedOn": branchObject.o.lastModifiedOn,
          "masterDocId": masterObject.id,
          "versionDocId": branchObject._id,
          "mergedDocData": [ ],
          "docChangeSet": {
            title: {
              changed: false,
              newTitle: ' '
            },
            /* Implies that the user did not re-arrange any existing Items in Master,
when matched */
            layout: {
```

```
            changed: false
        },
        /* Cards in this doc that are new, removed or modified */
        cards: [ ]
    ]
} ;
//<editor-fold desc="Utility functions for Hierarchical Content Model processing">
// Method pulls out all relevant metadata about the node (representing a content item in a content model)
var _mapNode = function(tNode, tLevel, parentNode, predNode, succNode) {
    var parentId = '_NONE_',
        predId = '_NONE',
        succId = '_NONE';
    if(parentNode && parentNode.id) parentId = parentNode.id;
    if(predNode && predNode.id) predId = predNode.id;
    if(succNode && succNode.id) succId = succNode.id;
    return {
        _id: tNode.id,
        title: tNode.title,
        level: tLevel,
        parentId: parentId,
        predecessor: predId,
        successor: succId,
        changeType: ' '
    };
};
// Flattens a nested content model into a single-dimensional array while preserving parent-child order
var _flattenArray = function(arrayArg, key, level, parentNode) {
    var res = [ ],
        predNode = null,
        succNode = null;
    for (var 1 = 0; 1 < arrayArg.length; i++) {
        predNode = null;
        succNode = null;
        if(i > 0 && i < arrayArg.length) predNode = arrayArg[i-1];
        if(i < (arrayArg.length-1)) succNode = arrayArg[i+1];
        res.push(_mapNode(arrayArg[i], level, parentNode, predNode, succNode));
        if (arrayArg[i][key].length > 0) {
            res = res.concat(_flattenArray(arrayArg[i][key], key, level+1, arrayArg[i]));
        }
    }
    return res;
};
// Index the array by matchId and return the Index object
var _flatArrayIndex = function(theFlatArray, useMatchId) {
    var theIndexObject = { };
    for(var i=0, maxI=theFlatArray.length; i < maxI; i++) {
        if(useMatchId) {
            theIndexObject[theFlatArray[i].matchId] = theFlatArray[i];
        } else {
            theIndexObject[theFlatArray[i]._id = theFlatArray[i];
        }
    }
    return theIndexObject;
};
var _flatArrayIndexByPosition = function(theFlatArray, useMatchId) {
    var theIndexObject = { };
    for(var i=0, maxI=theFlatArray.length; i < maxI; i++) {
        if(useMatchId) {
            theIndexObject[theFlatArray[i].matchId] = i;
        } else {
            theIndexObject[theFlatArray[i].id] = i;
        }
    }
    return theIndexObject;
};
// store _ids Into supplied array with dedupe
var _flatArrayExtractIds = function(theFlatArray, trackingArray) {
    for(var i=0, maxI=theFlatArray.length; i < maxI; i++) {
        // Dedupe and push the _id of this item to the tracking array, if supplied (optional)
        if(trackingArray && trackingArray.indexOf(theFlatArray[i]._id) === -1) {
            trackingArray.push(theFlatArray[i]._id);
        }
    }
};
// Memoize for our typical nestedModel2 attr which has a child array called 'nodes'
```

```
as the descendant key
    var _flattenNestedModel = function(nestedModelArr) {
        return _flattenArray(nestedModelArr, 'nodes', 0, null);
    };
//</editor-fold>
    var_compareTitle = function( ) {
        var titleComparison = {
            changed: false,
            newTitle: ' '
        };
        if(masterObject.data.hasOwnProperty('title') && branchObject.data.hasOwnProperty
('title')) {
            if(masterObject.data.title !== branchObject.data.title) {
                titleComparison.changed = true;
                titleComparison.newTitle = branchObject.data.title;
            }
        } else {
            // If they don't both have titles, they are different anyway
            titleComparison.changed = true;
            if(branchObject.data.title) titleComparison.newTitle =
branchObject.data.title;
        }
        return titleComparison;
    };
    // This method removes all Title data (optional attr) to ensure the hash comparison
of TOCs is accurate
    var _recurseRemoveNestedModelTitles = function(argToUpdate) {
        for (var k = 0, maxK = argToUpdate.length; k < maxK; k++) {
            argToUpdate[k].title = ' '
            if (argToUpdate[k].nodes && argToUpdate[k].nodes.length > 0)
                _recurseRemoveNestedModelTitles(argToUpdate[k].nodes);
        }
    };
    var _compareNestedModels = function( ) {
        var masterModelHash, branchModelHash;
        // First clear out the title placeholders in these models
        _recurseRemoveNestedModelTitles(masterObject.data.model.nestedModel2);
        _recurseRemoveNestedModelTitles(branchObject.data.model.nestedModel2);
        // Now computethe hashes of the pure model arrays
        sha1hash1.update(JSON.stringify(masterObject.data.model.nestedModel2));
        masterModelHash = sha1hashl.digest('hex').toString( );
        sha1hash2.update(JSON.stringify(branchObject.data.model.nestedModel2));
        branchModelHash = sha1hash2.digest('hex').toString( );
        return (masterModelHash === branchModelHash);
    };
    var _normalizeNodeMatchAttribute = function(theNode, attr, cardSourceIndex) {
        if(cardSourceIndex.hasOwnProperty(theNode[attr])) {
            var theCard = cardSourceIndex[theNode[attr]],
                isVersionCard = (theCard.s.pType === 'contentitem');
            if(attr === '_id') {
                // The card retrieved is the Node's own card
                // Initialize the reference in the node to its Card
                theNode.card = theCard;
                // Update the Node title
                theNode. title = theCard.data.topic;
                if(IsVersionCard) {
                    // This is a version content Item, so the Match _id to be used in
model comparison is the parent card _id
                    theNode.matchId = theCard.s.pId.toString( );
                } else {
                    // This node represents a master content Item (from one of the authors
Involved) so alias match _id to the nodes _id
                    theNode.matchId = theNode._id;
                }
            } else if('predecessor', 'successor', 'parentId'].indexof(attr) !== -1) {
                if(IsVersionCard) {
                    // The predecessor referenced here is a version, so sub its parent
ID for match purposes
                    theNode[attr] = theCard.s.pId.toString( );
                }
            }
        }
    };
    var _loadCardDataIntoFlatArray = function(theFlatArray, cardSourceIndex) {
        for(var i=0, maxI=theFlatArray.length; i < maxI; i++) {
            var currNode = theFlatArray[i];
            // Normalize attributes using the card
            _normalizeNodeMatchAttribute(currNode, '_id', cardSourceIndex);
            // Normalize Parent/Predecessor/Successor Data here too
```

```
            // TODO Refactor this at some point - this is sub-optimal
            _normalizeNodeMatchAttribute(currNode, 'parentId', cardSourceIndex);
            _normalizeNodeMatchAttribute(currNode, 'successor', cardSourceIndex);
            _normalizeNodeMatchAttribute(currNode, 'predecessor', cardSourceIndex);
        }
    };
    var _loadComparisonData = function(done) {
        // Flatten the models and Index/process all referenced card IDs
        comparisonData.flatMasterModel =_flattenNestedModel(masterObject.data.model.-nestedModel2);
        _flatArrayExtractIds(comparisonData.flatMasterModel, comparisonData.sourceCardIds);
        comparisonData.flatBranchModel = _flattenNestedModel(branchObject.data.model.-nestedModel2);
        _flatArrayExtractIds(comparisonData.flatBranchModel, comparisonData.sourceCardIds);
        comparisonData.flatBranchMasterModel =_flattenNestedModel(branchObject.data.-model.branchMasterModelSnapshot);
        _flatArrayExtractIds(comparisonData.flatBranchMasterModel, comparisonData.sourceCardIds);
        comparisonData.branchSnapshotDate = branchObject.o.createdOn;
        // At this point, all the card IDs Involved havebeen loaded Into the array so get the actual cards from the DB
        // Also, cross-checkcounts on the queries in case anything is missing
        contentDb.models.contentitem.find({_id: {$in: comparisonData.sourceCardIds}}, function(err, theCardDocs) {
            if(err) {
                return done(err.message);
            }
            If(comparisonData.sourceCardIds.length !== theCardDocs.length) {
                // TODO Analyze: Is this a tolerable difference? Recovery despite it?
                done('Computing a changeset and finding source card list length does not match available cards: ' +
                    comparisonData.sourceCardIds.length + ', ' + theCardDocs.length);
            } else {
                // We have all the relevant cards Involved, Index and store them
                comparisonData.sourceCards = theCardDocs;
                comparisonData.sourceCardIndex = _flatArrayIndex(comparisonData.sourceCards, false);
                // Map the card data into the respective model nodes, including identifying the match _id per node
                _loadCardDataIntoFlatArray(comparisonData.flatMasterModel, comparisonData.sourceCardIndex);
                _loadCardDataIntoFlatArray(comparisonData.flatBranchModel, comparisonData.sourceCardIndex);
                _loadCardDataIntoFlatArray(comparisonData.flatBranchMasterModel, comparisonData.sourceCardIndex);
                // Create indexes to the various models using the match _id attribute of each node, now that It isavailable
                comparisonData.flatMasterModelIndex = _flatArrayIndex(comparisonData.flatMasterModel, true);
                comparisonData.flatBranchModelIndex = _flatArrayIndex(comparisonData.flatBranchModel, true);
                comparisonData.flatBranchMasterModelIndex = _flatArrayIndex(comparisonData.flatBranchMasterModel, true);
                done( );
            }
        });
    };
    var _insertModelNodeAtBestGuess = function(insertNode, targetModelArray) {
        // Need to insert this card into the right spot with changeType 'Added'
        // First look for the parent of this node in the current master
        // - If found, look for either a predecessor and/or successor at the same level to locate the right place in the array to add this card
        // - If pred/succ found, Insert after or before as the case may be
        // - If both pred/succ are not available, Insert at the end of the same level
        // - If not found, look for either a predecessor and/or successor starting from the top to locate the right place in the array to add this card
        // - If pred/succ found, Insert after or before as the case may be
        // - If both pred/succ are not available, Insert at the end of the array
        var targetArrayIndex =_flatArrayIndexByPosition(targetModelArray, true),
            targetInsertionIndex = -1;
        var _matchParentFunction = function(tNode) {
            if(tNode.matchId === insertNode.parentId) {
                return true;
            }
        };
        var _matchPredSucc = function(tNode) {
            return (
```

```
                tNode.matchId === InsertNode.predecessor ||
                tNode.matchId === InsertNode.successor
            };
        };
        var predSuccMatchEl = _.find(targetModelArray, _matchPredSucc);
        if(predSuccMatchEl) {
            targetInsertionIndex = targetArrayIndex[predSuccMatchEl.matchId];
            if(insertNode.predecessor === predSuccMatchEl.matchId) {
                targetInsertionIndex++;
            }
        } else {
            var parentMatchEl = _.find(targetModelArray, _matchParentFunction);
            if(parentMatchEl) {
                targetInsertionIndex = targetArrayIndex[parentMatchEl.matchId];
                while(
                    (targetModelArray[targetInsertionIndex].matchId === parentMatchEl.
matchId ||
                    targetModelArray[targetInsertionIndex].parentId === parentMatchEl.
matchId) &&
                    targetInsertionIndex < targetModelArray.length)
                {
                    targetInsertionIndex++;
                }
            } else {
                targetInsertionIndex = targetModelArray.length;
            }
        }
        targetModelArray.splice(targetInsertionIndex, 0, insertNode);
    };
    var _computeMergedDoc = function( ) {
        var branchSnapshotTimestamp = moment(comparisonData.branchSnapshotDate);
        // Mark up removals by iterating over the branch master array first
        for(var i=0, maxI=comparisonData.flatBranchMasterModel[i];
{
            var brMasterNode = comparisonData.flatBranchMasterModel[i];
            // Is this available in the branch?
            if(!comparisonData.flatBranchModelIndex.hasOwnProperty(brMasterNode.matchId)) {
                // Mark as removed in the Branch master
                brMasterNode.changeType = 'Removed';
                // It has been removed...so if this is still in Master, mark as removed
                if(comparisonData.flatMasterModelIndex.hasOwnProperty(brMasterNode.matchid)) {
                    comparisonData.flatMasterModelIndex[brMasterNode.matchId].changeType =
'Removed';
                }
            }
        }
        // Iterate over the branch to determine additions and changed cards
        for(i=0, maxI=comparison.flatBranchModel.length; i < maxI; i++) {
            var branchNode = comparisonData.flatBranchModel[i],
                brCard = branchNode.card;
            // The card is net new (it may have been re-added) if it isn't in the current
Master
            if(!comparisonData.flatMasterModelIndex.hasOwnProperty(branchNode.matchId)
) {
                branchNode.changeType = 'Added';
                _insertModelNodeAtBestGuess(branchNode, comparisonData.flatMasterModel
);
                // Update the master model index
                comparisonData.flatMasterModelIndex =
_flatArrayIndex(comparisonData.flatMasterModel, true);
            } else {
                // This may have been edited
                var modTimestamp = moment(brCard.o.lastModifiedOn),
                    createTimestamp = moment(brCard.o.createdOn);
                if(modTimestamp.isAfter(createTimestamp)) {
                    branchNode.changeType = 'Edited';
                    comparisonData.flatMasterModelIndex[branchNode.matchId].changeType =
'Edited';
                }
            }
        }
        return comparisonData.flatMasterModel;
    };
    // Main for the Merge computation
    // First load all the comparison data
    _loadComparisonData(function(err) {
        if(err) {
            errMsg += err;
            return callback(errMsg,null);
```

```
    }
    // Compute all differentials and store in the object to be returned to the caller
    resultChangeSet.docChangeSet.title = _compareTitle( );
    resultChangeSet.docChangeSet.layout = _compareNestedModels( );
    resultChangeSet.mergedDocData = _computeMergedDoc( );
  callback(null, resultChangeSet);
  });
};
```

The processes, functions and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In order to address various issues and advance the art, the entirety of this application for a COLLABORATION MECHANISM (including the Cover Page, Title, Headings, Background, Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments of the system disclosed herein may be implemented that enable a great deal of flexibility and customization. For example, aspects of the system disclosed herein may be adapted for images, spreadsheets, slide shows, video, audio or any other content. Accordingly, while various embodiments and discussions of the system disclosed herein have included discussions of applications to document creation, editing and collaboration, it is to be understood that the embodiments described herein may be readily configured and/or customized for a wide variety of other applications and/or implementations.

What is claimed is:

1. A method performed by a data processing apparatus, the method comprising:

receiving a master object comprising metadata associating the master object with an owner entity and a content model identifying at least one content item;

creating a branch object parented to the master object and associating the branch object with a collaborator that is different than the owner entity, the branch object including a snapshot of the master object at the time of the branch object creation;

receiving changes to the branch object from the collaborator and recording the changes in a draft branch object that is parented to the branch object;

receiving a submission of the draft branch object from the collaborator to the owner entity for review;

generating a changeset by inspecting metadata of the submitted draft branch object for an identification of its parent branch object and, based on the identification of its parent branch object, comparing (a) current contents of the master object with (b) the snapshot of the master object at the time of the parent branch object creation and (c) contents of the submitted draft branch object; and presenting the changeset to the owner entity for approval, wherein the creation of the branch object includes setting a status tag of the branch object to reflect its new status, the submission of the draft branch object includes setting the status tag of the branch object to reflect the submitted status of the draft branch object, and the generation of the changeset is triggered by the detection of the setting of the branch object's status flag to the submitted status.

2. The method of claim 1, wherein the branch object is immutable.

3. The method of claim 1, wherein the draft branch object includes a mutable copy of all content items referenced by the master object.

4. The method of claim 1, wherein the changeset includes an indication of content deletion if the comparison reveals that particular content is present in the current contents of the master object and the snapshot of the master object at the time of the parent branch creation but not in the submitted draft branch object.

5. The method of claim 1, wherein the changeset includes an indication of changed content if the comparison reveals that particular content present in the submitted draft object is different from that particular content as it exists in the current contents of the master object, regardless of the state of any of the particular content present in the snapshot of the master object at the time of the parent branch creation.

6. The method of claim 1, wherein the changeset includes an indication of new content if the comparison reveals that particular content is present in the submitted draft object but not the current contents of the master object, regardless of whether the particular content is present in the snapshot of the master object at the time of the parent branch creation.

7. The method of claim 6, further comprising identifying content proximate the new content in the submitted draft and, based on that identification, displaying the new content in the presentation of the changeset in the same proximity to any of the proximate content in the current contents of the master object.

8. The method of claim 1, further comprising receiving a delegation from the owner entity of a second collaborator responsible for reviewing the changeset and, instead of presenting the changeset to the owner entity for approval, presenting the changeset to the second collaborator for approval.

9. The method of claim 1, further comprising:
upon approval of a proposed change by the owner entity, creating a new version of the branch object with a new a snapshot of the master object reflecting the accepted proposed change.

10. A method performed by a data processing apparatus, the method comprising:
receiving a master object comprising metadata associating the master object with an owner entity and a content model identifying at least one content item;
creating a first branch object parented to the master object and associating the first branch object with a first collaborator that is different than the owner entity, the first branch object including a snapshot of the master object at the time of the first branch object creation;
receiving changes to the first branch object from the first collaborator and recording the changes in a draft first branch object that is parented to the first branch object;
creating a second branch object parented to the master object and associating the second branch object with a second collaborator that is different than the owner entity and the first collaborator, the second branch object including a snapshot of the master object at the time of the second branch object creation;
receiving changes to the second branch object from the second collaborator and recording the changes in a draft second branch object that is parented to the second branch object;
receiving a submissions to the owner entity for review of the draft first branch object from the first collaborator and the draft second branch object from the second collaborator;
generating a changeset associated with the draft first branch object by inspecting metadata of the submitted draft first branch object for an identification of its parent branch object and, based on the identification of its parent branch object, comparing (a) current contents of the master object with (b) the snapshot of the master object at the time of the parent first branch object creation and (c) contents of the submitted draft first branch object;
generating a changeset associated with the draft second branch object by inspecting metadata of the submitted draft second branch object for an identification of its parent branch object and, based on the identification of its parent branch object, comparing (a) current contents of the master object with (d) the snapshot of the master object at the time of the parent second branch object creation and (e) contents of the submitted draft second branch object; and
presenting the changesets to the owner entity for approval, wherein
the creation of the first branch object includes setting a status tag of the first branch object to reflect its new status,
the submission of the draft first branch object includes setting the status tag of the first branch object to reflect the submitted status of the draft first branch object,
the generation of the changeset associated with the draft first branch object is triggered by the detection of the setting of the first branch object's status flag to the submitted status,
the creation of the second branch object includes setting a status tag of the second branch object to reflect its new status,
the submission of the draft second branch object includes setting the status tag of the second branch object to reflect the submitted status of the draft second branch object, and
the generation of the changeset associated with the draft second branch object is triggered by the detection of the setting of the second branch object's status flag to the submitted status.

11. The method of claim 10, further comprising receiving an organizational hierarchy identifying the first collaborator as having more authority than the second collaborator, wherein the presentation of the changesets to the owner entity for approval includes, for any instance in which a conflict exists in the changesets between changes proposed by the first collaborator and changes proposed by the second collaborator, presenting the conflicting proposed changes made by the first collaborator and not presenting the conflicting changes proposed by the second collaborator.

12. The method of claim 10, further comprising receiving an organizational hierarchy identifying the first collaborator as having more authority than the second collaborator, wherein the presentation of the changesets to the owner entity for approval includes presenting the changeset associated with the draft first branch object before presenting the changeset associated with the draft second branch object.

13. The method of claim 10, wherein the presentation of the changesets includes presenting proposed changes as they appear in the order of current content of the master object, regardless of whether the proposed changes were identified from the draft first branch object or the draft second branch object.

14. The method of claim 10, wherein the presentation of the changesets to the owner entity for approval includes, for any instance in which a conflict exists in the changesets between proposed changes identified from the draft first branch object and proposed changes identified from the draft second branch object, presenting the conflicting proposed changes in chronological order according to the time that the conflicting proposed changes were made to the relevant draft branch object, regardless of whether the conflicting proposed changes were identified from the draft first branch object or the draft second branch object.

15. The method of claim 10, wherein the presentation of the changesets to the owner entity for approval includes, for any instance in which a conflict exists in the changesets between proposed changes identified from the draft first branch object and proposed changes identified from the draft second branch object, presenting the conflicting proposed changes in chronological order according to the time that the draft branch objects from which the proposed changes were identified were submitted.

* * * * *